United States Patent [19]
Davies

[11] Patent Number: 5,437,045
[45] Date of Patent: Jul. 25, 1995

[54] PARALLEL PROCESSING WITH SUBSAMPLING/SPREADING CIRCUITRY AND DATA TRANSFER CIRCUITRY TO AND FROM ANY PROCESSING UNIT

[75] Inventor: Daniel Davies, Palo Alto, Calif.

[73] Assignee: Xerox Corporation, Stamford, Conn.

[21] Appl. No.: 993,939

[22] Filed: Dec. 18, 1992

[51] Int. Cl.[6] .................. G06F 15/16; G06F 15/62
[52] U.S. Cl. .................. 395/800; 395/100; 382/293; 358/448; 364/230.6; 364/260; 364/260.6; 364/DIG. 1
[58] Field of Search ............... 375/800, 775, 275, 163, 375/162, 153, 100; 382/9, 44–47, 54–56; 358/160, 180, 443–453; 364/514, 518

[56] References Cited

U.S. PATENT DOCUMENTS

| | | | |
|---|---|---|---|
| 4,447,882 | 5/1984 | Walz | 364/521 |
| 4,656,515 | 4/1987 | Christopher | 358/183 |
| 4,712,140 | 12/1987 | Mintzer et al. | 358/260 |
| 4,736,438 | 4/1988 | Persoon et al. | 382/34 |
| 4,860,248 | 8/1989 | Lumelsky | 395/163 |
| 5,130,797 | 7/1992 | Murakami et al. | 358/133 |
| 5,148,500 | 9/1992 | Belanger | 382/55 |
| 5,148,547 | 9/1992 | Kahle et al. | 395/800 |
| 5,153,728 | 10/1992 | Nakayama et al. | 358/180 |
| 5,204,752 | 4/1992 | Yamakawa | 358/296 |
| 5,237,432 | 8/1993 | Calarco et al. | 358/451 |
| 5,253,308 | 10/1993 | Johnson | 382/49 |
| 5,329,614 | 7/1994 | Kidd et al. | 395/139 |

FOREIGN PATENT DOCUMENTS

| | | |
|---|---|---|
| 431961A2 | 6/1991 | European Pat. Off. . |
| 486143A2 | 5/1992 | European Pat. Off. . |

Primary Examiner—Eric Coleman
Assistant Examiner—Alpesh M. Shah

[57] ABSTRACT

A parallel processor includes processing units, data transfer circuitry, subsampling/spreading circuitry, and control circuitry. The subsampling/spreading circuitry can receive an item of data defining an image segment and use it to obtain another item of data defining the same image segment with a different amount of data. For example, a subsampling transceiver can obtain less data, such as one-half or 1/N as much, and a spreading transceiver can obtain more data, such as twice or N times as much. The data transfer circuitry can connect the processing units to the subsampling/spreading circuitry so that data can be transferred from any processing unit to the subsampling/spreading circuitry and vice versa. The processing units can be grouped and the data transfer circuitry can include N buses, with one processing unit in each group connected to each bus. The data transfer circuitry can also include a common bus and a holding register on the common bus. During subsampling, the N buses can transfer data to the subsampling circuitry, from which the resulting data goes to the common bus and is loaded into the holding register. In the next cycle, the data from the holding register is transferred back to one of the processing units. During spreading, data from one processing unit can be transferred to the holding register. In the next cycle, the data can be transferred to the spreading circuitry and then through the N buses to a group of processing units. During spreading, additional pixels can have a constant value or can take the value of one of the pixels between which they are added.

44 Claims, 15 Drawing Sheets

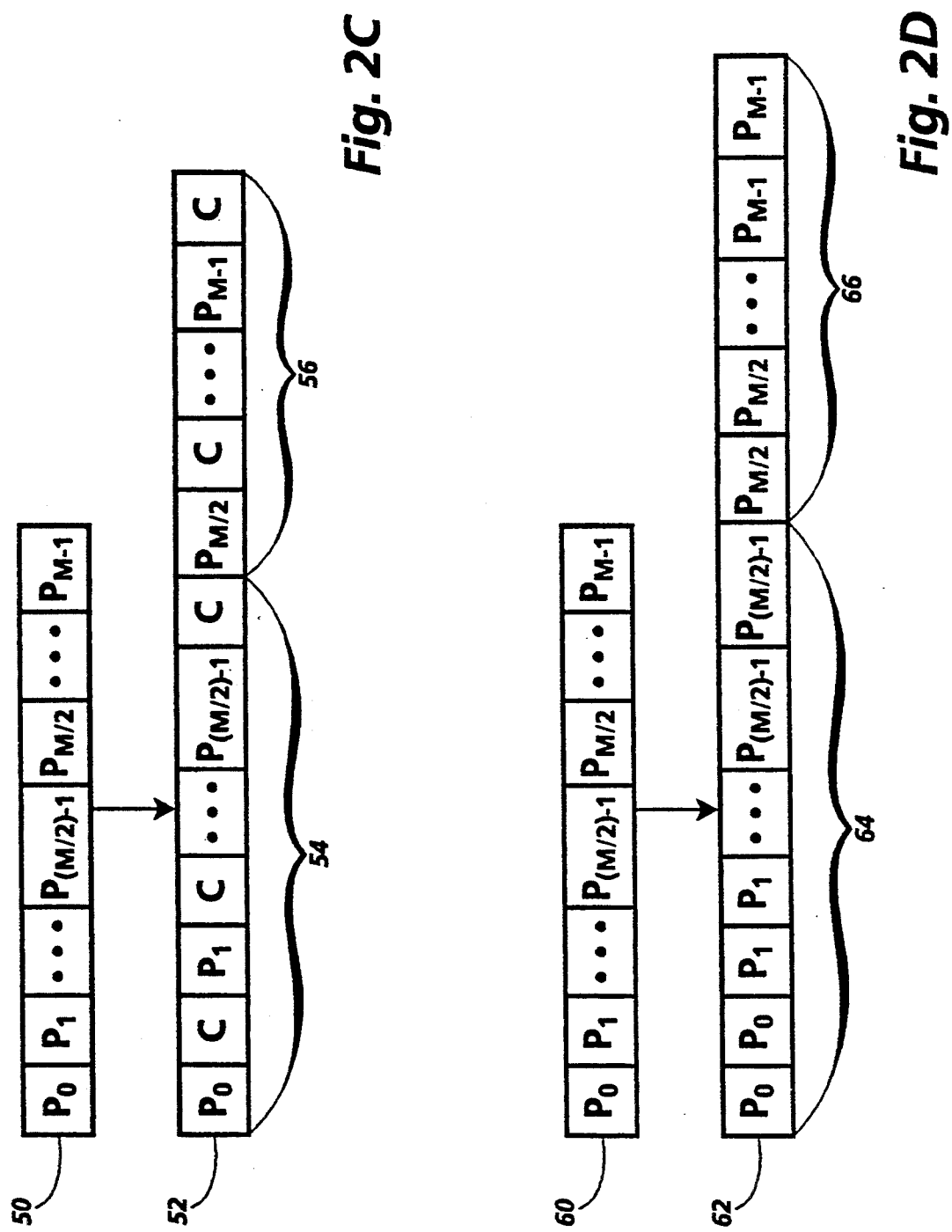

PARALLEL PROCESSING WITH SUBSAMPLING/SPREADING CIRCUITRY AND DATA TRANSFER CIRCUITRY TO AND FROM ANY PROCESSING UNIT

BACKGROUND OF THE INVENTION

The present invention relates to techniques for subsampling or spreading an image.

Bloomberg et al., EP-A 431 961, describe image reduction and enlargement techniques. As shown and described in relation to FIG. 10, specialized hardware can perform a logical operation between vertically adjacent pixelwords and a pairwise reduction of the resulting pixelword. Reduction occurs in two stages: In the first stage, a vertically adjacent pair of pixelwords is read from a first memory, a first logical operation is carried out, and a second logical operation is carried out between the resulting pixelword and a version that is shifted by one bit to provide a processed pixelword with bits of interest in every other bit position. In the second stage, the valid bits are extracted and compressed, and the result is stored in a second memory. The first stage is an array of bit-slice processors. The second stage includes first and second latched transceivers, each half as wide as a pixelword and each having two ports. One port of each transceiver is coupled to the odd bits of a data bus, which correspond to the bits of interest. The other port of the first transceiver is coupled to the lower half of the data bus, and the other port of the second transceiver is coupled to the upper half of the data bus.

Bloomberg et al. describe a 2×2 reduction in which a first pair of vertically adjacent pixelwords are read from the first memory onto the data bus and into registers in the first stage. After logical operations, the first stage provides data on the data bus that includes valid bits in the odd bit positions. The odd bits of the data bus are latched into the first latched transceiver. Then a second pair of pixelwords horizontally adjacent to the first pair are processed in the same way in the first stage, and the odd bits of the data bus are latched into the second latched transceiver. The contents of the two transceivers are then read out onto the data bus to obtain a pixelword that represents the reduction of four pixelwords, which is transferred to a second memory. This overall sequence continues until all pixelwords in a pair of rows are processed. Once the pair of rows has been processed, subsequent pairs are similarly processed.

Bloomberg et al. also describe image enlargement by executing the steps in the reverse order. The processor reads a pixelword and sends the left half through the port of the first transceiver that is coupled to the lower half of the data bus. The resulting word is read onto the data bus through the transceiver's other port, with only every other pixel valid, so the processor needs to validate all the pixels using a sequence of shifts and logic operations. The even bits are all 1's. The expanded pixelword, which alternates 1's with valid data, is read into registers in the first stage. After logical operations, the pixelword is written to two vertically adjacent words in an expanded image. The process is repeated for the right half of the pixelword using the second transceiver. The processor expands an entire row one pixelword at a time and an entire image one row at a time.

Bloomberg et al. note at page 14 lines 35–38 that their algorithms lend themselves to parallelism, with many processors independently performing thresholded reduction on parts of an image, such as bands of a given number of scanlines.

SUMMARY OF THE INVENTION

The invention deals with a problem in subsampling or spreading an image. Subsampling and spreading operations use a first item of data defining a segment of an image to produce a second item of data defining the same segment. In subsampling, the second item of data defines the segment with less data than the first item; an example of subsampling is a reduction operation. In spreading, the second item of data defines the segment with more data than the first item; an example of spreading is an enlargement operation.

Subsampling and spreading operations are often important in image processing. For example, it is often useful to reduce or enlarge an image before performing other image processing operations. Experience with morphological operations described by Bloomberg et al., above, indicates that one reduction or enlargement is typically performed for every ten morphological operations.

Bloomberg et al. describe special hardware that can be used to perform reduction and enlargement, as described above. It would be expensive and inefficient, however, to connect special hardware to each of a large number of processing units in a parallel processor. In addition to the cost of the special hardware, which would increase in proportion to the number of processing units, such an arrangement would require many additional connections and longer connecting lines.

The invention is based on the discovery of a technique that alleviates this problem. The technique provides subsampling/spreading circuitry that can perform an operation on an item of data defining an image segment to obtain another item of data defining the same image segment with a different amount of data. The technique also provides data transfer circuitry connecting each processing unit in a parallel processor to the subsampling/spreading circuitry so that the subsampling/spreading circuitry can operate on data from any of the processing units and provide the resulting data to any of the processing units. As a result, the cost of the subsampling/spreading circuitry is independent of the number of processing units, the number of connections is reduced, and the connecting lines need not be long.

The technique can be implemented in a parallel processor that also includes control circuitry. The control circuitry provides control signals to the processing units, the data transfer circuitry, and the subsampling/spreading circuitry. The control signals cause the data transfer circuitry to transfer a first item of data obtained from one or more of the processing units to the subsampling/spreading circuitry, cause the subsampling/spreading circuitry to use the first item of data to obtain a second item of data defining the same image segment with a different amount of data, and cause the data transfer circuitry to transfer the second item of data to one or more of the processing units.

The technique could be implemented, for example, in a single instruction multiple data (SIMD) parallel processor in which the control circuitry also provides data defining instructions to processing circuitry in each processing unit in parallel. The processing circuitry of all the processing units can be operated in parallel so that each processing unit obtains a first subsegment item of data defining a subsegment of an image and so that the first subsegment items together define a segment of the image. Then, the first subsegment items can be transferred from the processing units to the subsampling/spreading circuitry for operations that obtain second subsegment items of data that together define the same segment of the image with a different amount of data. Each second subsegment item of data can be transferred to one of the processing units.

The subsampling/spreading circuitry can take various forms. In each case, the data transfer circuitry can provide necessary connections, and registers in some cases, for transfer of items of data to and from the subsampling/spreading circuitry.

If the subsampling/spreading circuitry includes a 2:1 binary subsampling transceiver, the interconnecting circuitry can include two buses referred to as even and odd, both connected to the input side of the transceiver. The processing units can be paired, with one of each pair connected to the even bus and the other connected to the odd bus.

The interconnecting circuitry can also include a common bus connected to the output side of the transceiver. The interconnecting circuitry can also include a transfer register on the common bus and transceivers, one between the common bus and the even bus and another between the common bus and the odd bus. If the input side of the transceiver receives two items of data, one each from the even bus and the odd bus, the resulting subsampled item of data can be stored temporarily in the transfer register, then transferred back to a processing unit through a transceiver to either the even bus or the odd bus.

A 1:2 binary spreading transceiver could be used with the same interconnecting circuitry, but with items of data being transferred in the opposite direction. Or a single transceiver could be operated in either of two modes; in one mode it would be a 2:1 subsampling transceiver, and in the other it would be a 1:2 spreading transceiver. During 1:2 spreading, alternate bits can all be pulled to zero or to one or, instead, each bit from a first item of data can be used to drive two bits of a second item of data.

The subsampling/spreading circuitry can also include a 2:1 subsampling transceiver or a 1:2 spreading transceiver for multi-bit pixels. To subsample, alternate pixels in a first item of data are included in a second item of data; shifting can be reduced with two such transceivers, one for selecting even pixels and one for selecting odd pixels. To spread, every alternate pixel can be driven to zero or one or, instead, each pixel in a first item of data can be used to drive two pixels of a second item of data.

More generally, N:1 subsampling or 1:N spreading can be provided by forming groups that each include N processing units. The interconnecting circuitry can include N buses, with one processing unit in each group connected to each bus. The subsampling/spreading circuitry can include an N:1 subsampling transceiver that receives items of data from all N buses and provides an item of subsampled data that includes every Nth pixel from the items of input data. Similarly, a 1:N spreading transceiver could drive one pixel on each of the N buses with a pixel from the common bus while other pixels on each of the N buses are pulled to zero or one; or each pixel from the common bus could drive all the pixels on a respective one of the N buses.

The technique described above is efficient and simple. In addition, it can be used in a number of ways other than to reduce or enlarge an image, including thresholded reduction or subsampling, spreading of pixels to avoid cross-pixel effects, and rectangle rotation.

The following description, the drawings, and the claims further set forth these and other aspects, objects, features, and advantages of the invention.

BRIEF DESCRIPTION OF THE DRAWINGS

FIG. 2C is a schematic flow diagram showing items of data in a 1:2 binary spreading operation using circuitry like that in FIG. 1.

FIG. 2D is a schematic flow diagram showing items of data in another 1:2 binary spreading operation using circuitry like that in FIG. 1.

DETAILED DESCRIPTION

A. Conceptual Framework

Figure 1:
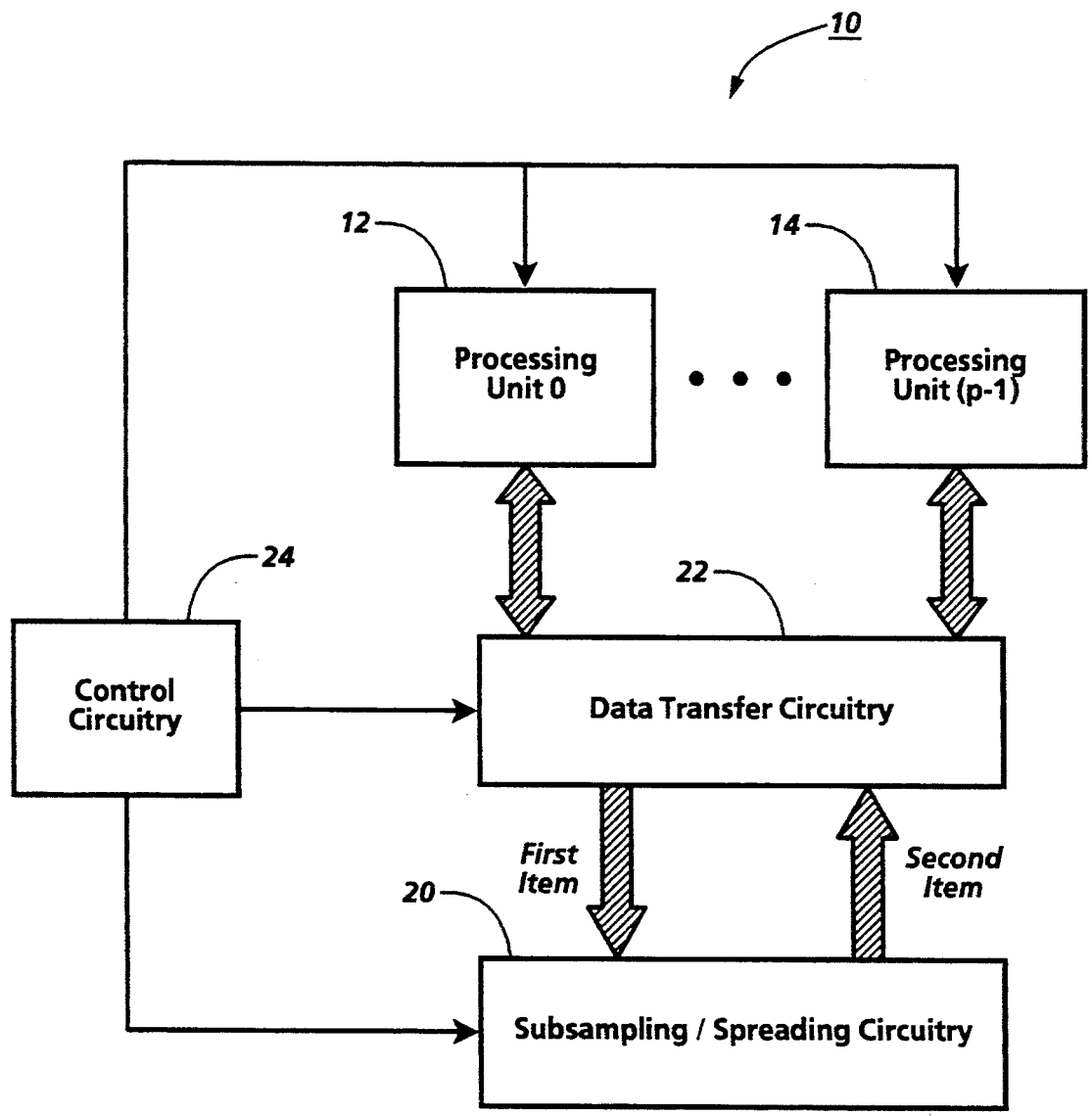
FIG. 1 is a schematic block diagram showing general components of a processor with subsampling/scaling circuitry interconnected to processing units.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored are different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

A "block" of items of data is a number of items of data that form a sequence.

A processor or other component of circuitry "uses" an item of data in performing an operation when the result of the operation depends on the value of the item. For example, the operation could perform a logical or numerical operation on the item or could use the item to access another item of data.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "image" is a pattern of light.

An image may be divided into "segments," each of which is itself an image. A segment of an image may be of any size up to and including the whole image.

An "array of data" or "data array" or "array" is a combination of items of data that can be mapped into an array. A "two-dimensional array" is a data array whose items of data can be mapped into an array having two dimensions.

An item of data "defines" an image when the item of data includes sufficient information to produce the image. For example, a two-dimensional array can define all or any part of an image, with each item of data in the array providing a value indicating the color of a respective location of the image.

A "pixel" is the smallest segment of an image whose value is indicated in an item of data defining the image. In an array defining an image in which each item of data provides a value indicating a color, each value may be called a "pixel value". Each pixel value is a bit in the "binary form" of the image, a gray scale value in a "gray scale form" of the image, or a set of color space coordinates in a "color coordinate form" of the image, the binary form, gray scale form, and color coordinate form each being a two-dimensional array defining the image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

An "amount of data" in an item of data can be measured by counting the number of units of data of a specific size in the item of data. The amount of data in a binary item of data can be measured, for example, by counting the number of bits in the item. An item of data defines an image "with an amount of data" when the part of the item of data that defines the image includes the amount of data.

"Subsampling/spreading circuitry" is circuitry that can receive an item of data relating to an image segment and use the item of data to obtain another item of data that relates to the same image segment with a different amount of data. "Subsampling circuitry" is subsampling/spreading circuitry that obtains another item of data with less data than the received item of data. "Spreading circuitry" is subsampling/spreading circuitry that obtains another item of data with more data than the received item of data.

A "transceiver" is a component that can receive a signal and provide the same signal. A transceiver could therefore include more than one integrated circuit, each of which could also be a transceiver.

An "N:1 subsampling transceiver" is a component that can receive N signals and provide one of the N signals. An N:1 subsampling transceiver could, for example, receive an item of data that includes a number of sequences of pixel values in which each sequence includes N values. The subsampling transceiver would provide an item of data that includes one value from each sequence.

A "1:N spreading transceiver" is a component that can receive one signal and provide N signals. A 1:N spreading transceiver could, for example, receive an item of data that includes a number of pixel values. The spreading transceiver would provide an item of data that includes a sequence of pixel values for each pixel value in the received item of data, in which each sequence including N values.

An item of data includes "bit sets" when it includes a number of sets of bits; for example, each bit set could "define a pixel" by indicating a pixel value with one or more bits. "Alternate bit sets" are either the even numbered bit sets, or "even bit sets", or the odd numbered bit sets, or "odd bit sets", in an item of data in which bit sets occur in order so that they can be numbered. Unless otherwise indicated, the first bit set in order is treated herein as numbered zero, so that it is the first even bit set. "Adjacent bit sets" in an item of data are bit sets that occur in consecutive positions in the item; spreading circuitry could, for example, add additional bit sets between adjacent bit sets in an item Of data to obtain another item of data.

A first component provides a signal to a plurality of other components "in parallel" when all of the other components receive the signal from the first component at approximately the same time.

An operation or component can provide or transfer an item of data to a single receiving component "in parallel" if the item of data includes a plurality of bits and the receiving component receives all of the bits at approximately the same time.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

A first component "controls" a second component when signals from the first component determine how the second component operates.

Signals "cause" or "control" an operation of a component if the signals determine how the operation is performed.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

"Connecting circuitry" is circuitry that connects two or more components.

"Interconnecting circuitry" is circuitry that interconnects a plurality of components. The components are interconnected "into an array" by interconnecting circuitry that permits transfer of signals to and from a component that can be mapped to a given position in an array only through connections to other components that can be mapped to adjacent positions in the array.

The array is "one-dimensional" if each component has at most two adjacent components, so that the components together can be mapped onto a line according to their interconnections.

"Bus circuitry" or a "bus" is circuitry connecting a plurality of components, at least one of which is a "source" and at least one of which is a "destination," such that the bus circuitry is capable of transferring a signal provided by any of the sources to all of the destinations. Some devices connected to bus circuitry can act either as sources or destinations.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

A "parallel processor" is a processor that includes more than one processing unit, each able to perform operations on data in parallel with the others.

B. General Features

Figure 2A:
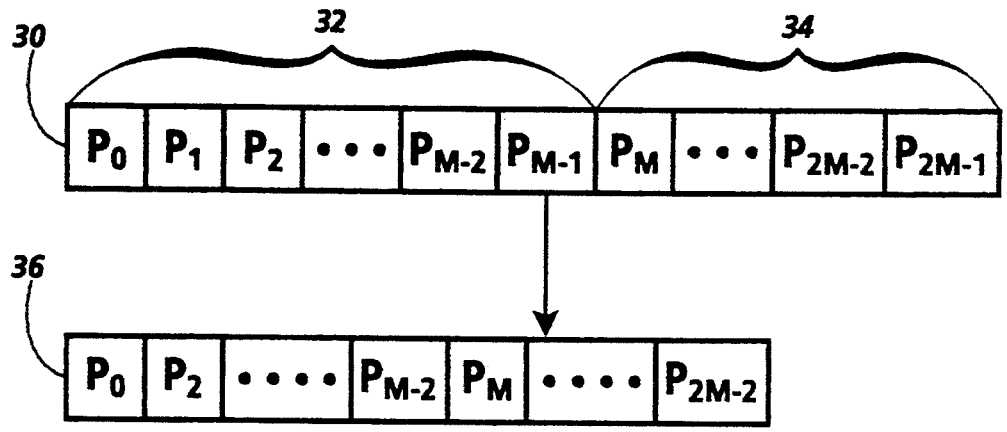
FIG. 2A is a schematic flow diagram showing items of data in a 2:1 binary subsampling operation using circuitry like that in FIG. 1.
Figure 2B:
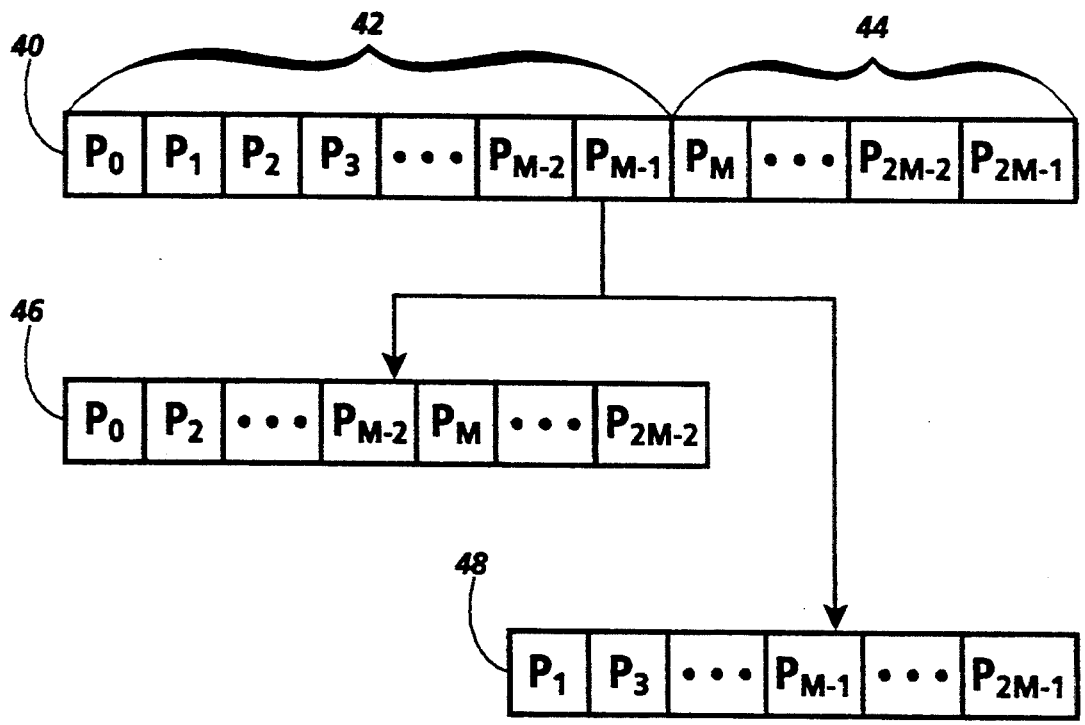
FIG. 2B is a schematic flow diagram showing items of data in another 2:1 binary subsampling operation using circuitry like that in FIG. 1.
Figure 2E:
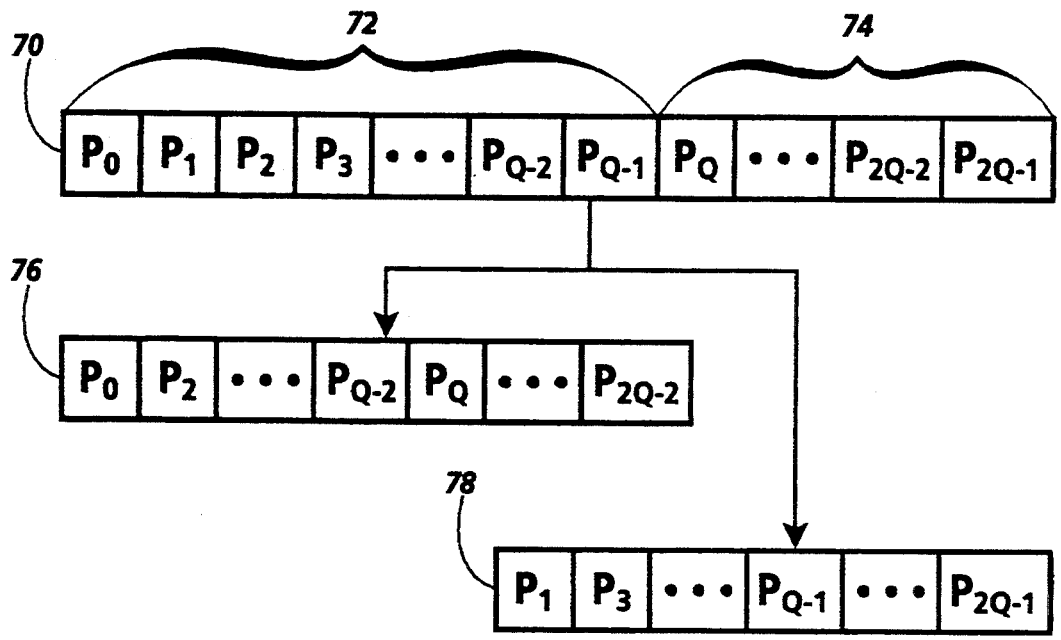
FIG. 2E is a schematic flow diagram showing K-bit pixels in items of data in a 2:1 subsampling operation using circuitry like that in FIG. 1.

FIGS. 1–2E illustrate general features of the invention. FIG. 1 shows components of a parallel processor that includes subsampling spreading circuitry. FIG. 2A shows first and second items of data in a 2:1 binary subsampling operation. Each of FIGS. 2B and 2C shows first and second items of data in a 1:2 binary spreading operation. FIG. 2D shows K-bit pixels in items of data in a 2:1 subsampling operation. FIG. 2E shows items of data in an N:1 subsampling operation.

Parallel processor 10 in FIG. 1 includes p processing units 12 through 14, illustratively numbered from zero through (p-1). Parallel processor 10 could for example be a SIMD parallel processor with an array of processing units including processing units 12 through 14.

Parallel processor 10 also includes subsampling/spreading circuitry 20. Subsampling/spreading circuitry 20 can receive an item of data defining an image segment and use it to obtain another item of data defining the same image segment, but with a different amount of data.

Parallel processor 10 also includes data transfer circuitry 22 connecting processing units 12 through 14 to subsampling/spreading circuitry 20. Data transfer circuitry 22 can transfer data from any processing unit to subsampling/spreading circuitry 20 and can transfer data from subsampling/spreading circuitry 20 to any processing unit.

Parallel processor 10 also includes control circuitry 24 connected to provide control signals to processing units 12 through 14, to data transfer circuitry 22, and to subsampling/spreading circuitry 20. The control signals cause data transfer circuitry 22 to transfer a first item of data obtained from the processing units to subsampling/spreading circuitry 20. The control signals also cause subsampling/spreading circuitry 20 to use the first item of data to obtain a second item of data. The control signals also cause data transfer circuitry 22 to transfer the second item of data to the processing units. The first item of data defines an image segment with a first amount of data. The second item of data defines the same image segment but with a second amount of data different than the first amount of data.

FIG. 2A shows data item 30, which includes two M-bit data items 32 and 34. Data item 32 includes values for binary pixels $P_0$ through $P_{(M-1)}$, while data item 34 includes values for binary pixels $P_M$ through $P_{(2M-1)}$. A 2:1 binary subsampling operation uses data item 30 to obtain M-bit data item 36. As a result of the operation, data item 36 includes only the values for the even numbered binary pixels in data items 32 and 34, from pixel $P_0$ through pixel $P_{(2M-2)}$.

The operation in FIG. 2A could alternatively obtain an M-bit data item that includes only the values for the odd numbered binary pixels in data items 32 and 34, from pixel $P_1$ through pixel $P_{(2M-1)}$. Alternatively, after obtaining an M-bit data item with the even numbered pixels as in FIG. 2A, a version of data item 30 shifted by one bit to the left could be provided to the subsampling/spreading circuitry to obtain an M-bit data item with the odd numbered pixels.

FIG. 2B shows a 2:1 binary subsampling operation that extends the operation shown in FIG. 2A to obtain two M-bit data items, one with even numbered pixels and the other with odd numbered pixels. Data item 40 includes two M-bit data items 42 and 44, each including M binary pixels. Data item 42 includes values for pixels $P_0$ through $P_{(M-1)}$, while data item 44 includes values for pixels $P_M$ through $P_{(2M-1)}$. A 2:1 subsampling operation uses data item 40 to obtain two M-bit data items 46 and 48. As a result of the operation, data item 46 includes only the values for the even numbered binary pixels in data items 42 and 44, from pixel $P_0$ through pixel $P_{(2M-2)}$, and data item 48 includes only the values for the odd numbered binary pixels in data items 42 and 44, from pixel $P_1$ through pixel $P_{(2M-1)}$.

Subsampling/spreading circuitry that can perform the operation by obtaining data items 46 and 48 in parallel as shown in FIG. 2B can be faster than circuitry that would first obtain data item 46, then shift data item 40 to obtain data item 48. Such circuitry may be impractical, however, because it may require additional circuitry to provide both of data items 46 and 48 to the processing units. The additional circuitry is not necessary if the subsampling/spreading circuitry can obtain one M-bit data item from data item 40, either data item 46 or data item 48, in response to a control signal that indicates even or odd pixels.

FIG. 2C shows M-bit data item 50, which includes values for binary pixels $P_0$ through $P_{(M-1)}$. A 1:2 binary spreading operation uses data item 50 to obtain 2M-bit data item 52, which includes two M-bit data items 54 and 56. As a result of the operation, data item 54 includes values for the lower half of the binary pixels in data item 50, pixels $P_0$ through $P_{((M/2)-1)}$, alternated with the value C, a constant pixel value which can be zero or one since the pixels are binary. Similarly data item 56 includes values for the upper half of the binary pixels in data item 50, pixels $P_{(M/2)}$ through $P_{(M-1)}$, alternated with the value C.

FIG. 2D shows an alternative to the operation in FIG. 2C. Data item 60 includes values for binary pixels $P_0$ through $P_{(M-1)}$. A 1:2 binary spreading operation uses data item 60 to obtain 2M-bit data item 62, which includes two M-bit data items 64 and 66. As a result of the operation, data item 64 includes values for the lower half of the binary pixels in data item 60, pixels $P_0$ through $P_{((M/2)-1)}$, with each value occurring twice in adjacent positions. Similarly data item 66 includes values for the upper half of the binary pixels in data item 60, pixels $P_{(M/2)}$ through $P_{(M-1)}$, with each value occurring twice in adjacent positions.

FIG. 2E shows a 2:1 subsampling operation similar to the operation in FIG. 2B but appropriate for multi-bit pixels. Data item 70 includes two M-bit data items 72 and 74, each including Q K-bit pixels, where Q=(M/K). Data item 72 includes values for pixels $P_0$ through $P_{(Q-1)}$, while data item 74 includes values for pixels $P_Q$ through $P_{(2Q-1)}$. A 2:1 subsampling operation uses data item 70 to obtain two M-bit data items 76 and 78. As a result of the operation, data item 76 includes only the values for the even numbered pixels in data items 72 and 74, from pixel $P_0$ through pixel $P_{(2Q-2)}$, and data item 78 includes only the values for the odd numbered pixels in data items 72 and 74, from pixel $P_1$ through pixel $P_{(2Q-1)}$.

As discussed above in relation to FIG. 2B, subsampling/spreading circuitry that can obtain data items 76 and 78 in parallel as shown in FIG. 2E can be faster than circuitry that would first obtain data item 76, then shift data item 70 one pixel width (K bits) to the left to obtain data item 78. Another fast alternative would be subsampling/spreading circuitry that can obtain either data item 76 or data item 78 from data item 70, in response to a control signal that indicates even or odd pixels.

Techniques like those in FIGS. 2C and 2D could similarly be implemented to perform a 1:2 spreading operation for multi-bit pixels.

Figure 2F:
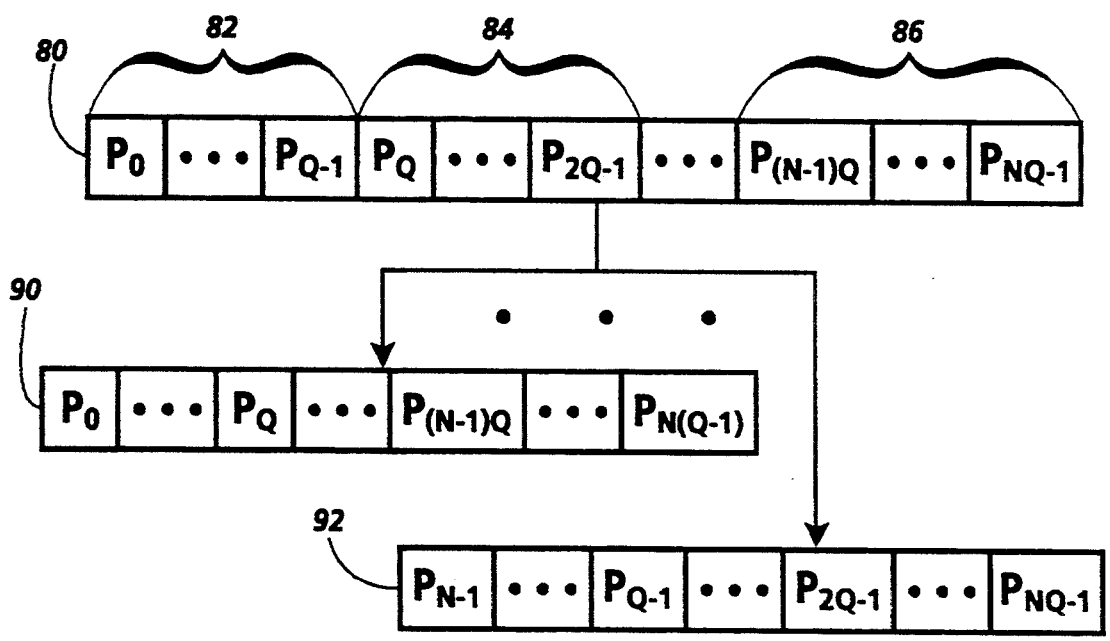
FIG. 2F is a schematic flow diagram showing items of data in an N:1 subsampling operation.

FIG. 2F shows an N:1 subsampling operation that can be applied to binary or multi-bit pixels and that is a generalization of the operations in FIGS. 2B and 2E. Data item 80 includes N M-bit data items 82, 84, through 86, each including Q K-bit pixels, where Q=(M/K). Data item 82 includes values for pixels $P_0$ through $P_{(Q-1)}$, data item 84 includes values for pixels $P_Q$ through $P_{(2Q-1)}$, and data item 86 includes values for pixels $P_{(N-1)Q}$ through $P_{NQ-1}$. An N:1 subsampling operation uses data item 80 to obtain N M-bit data items 90 through 92, where each of data items 90 through 92 includes every Nth pixel from data item 80, i.e. R pixels from each of data items 82, 84, through 86, where R=(Q/N). Data item 90 thus includes every Nth pixel from pixel $P_0$ through pixel $P_{(N(Q-1))}$, including pixels $P_Q$ and $P_{((N-1)Q)}$. Data item 92 includes every Nth pixel from pixel $P_{(N-1)}$ through pixel $P_{(NQ-1)}$, including pixels $P_{(Q-1)}$ and $P_{(2Q-1)}$.

As discussed above in relation to FIGS. 2B and 2E, it may be undesirable to obtain the N data items 90 through 92 in parallel. Therefore, the subsampling circuitry can provide only one M-bit data item, such as data item 90, and data item 80 can be shifted one pixel to the left to obtain each successive M-bit data item. Or the subsampling circuitry can provide any of the M-bit data items in response to a control signal indicating which is requested.

Techniques similar to those in FIGS. 2C or 2D could similarly be used to perform a 1:2 spreading operation for multi-bit pixels or a 1:N spreading operation for binary or multi-bit pixels.

C. General Implementation Features

The general features described above in relation to FIGS. 1–2F could be implemented in many different ways with a wide variety of components and with various integrated circuit technologies. The following implementation employs commercially available byte-slice integrated circuits to perform coprocessing in a Sun SPARCStation workstation.

Figure 3:
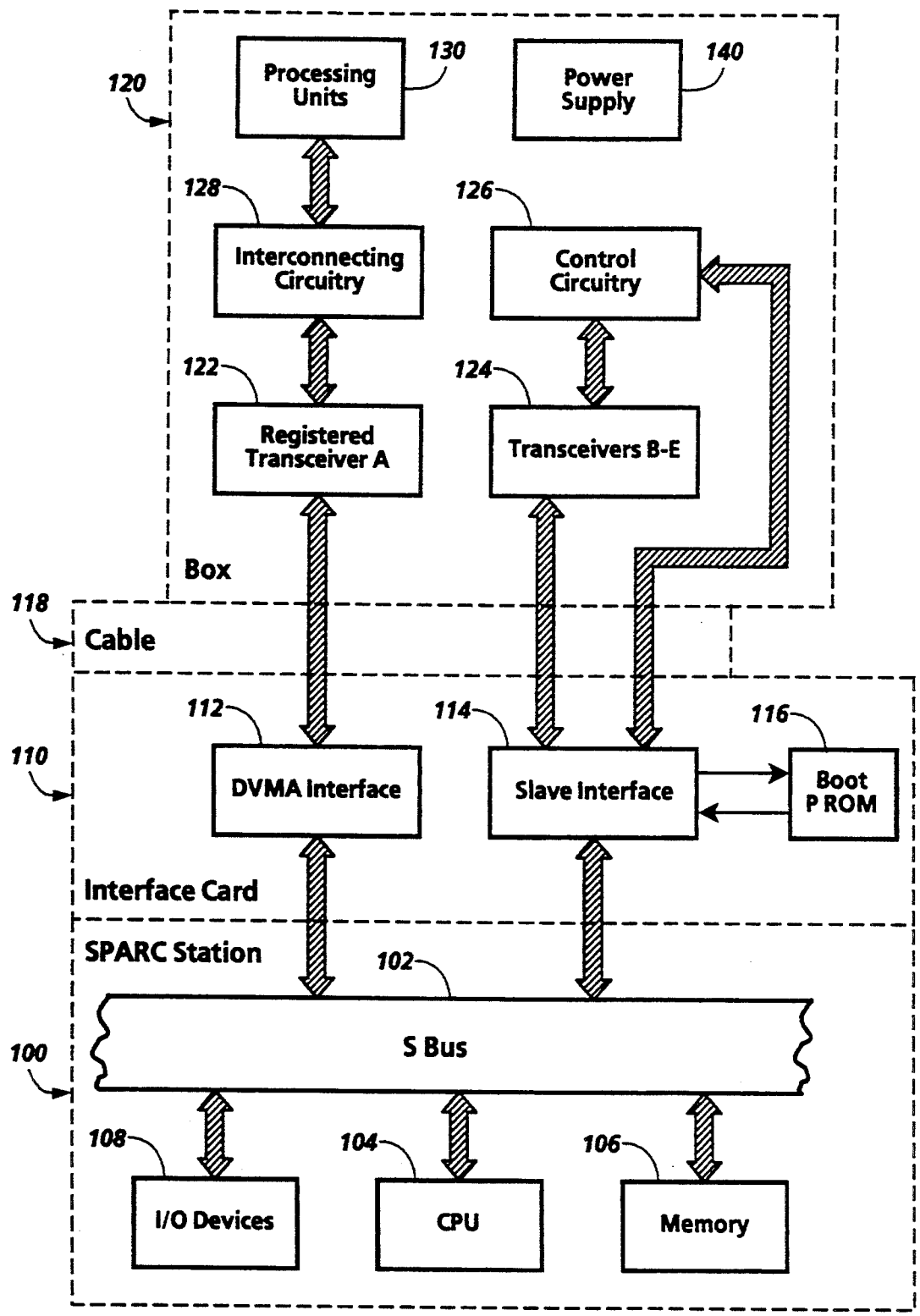
FIG. 3 is a schematic block diagram showing components in an implementation of a SIMD parallel processor connected to an SBus of a SPARCStation.
Figure 4:
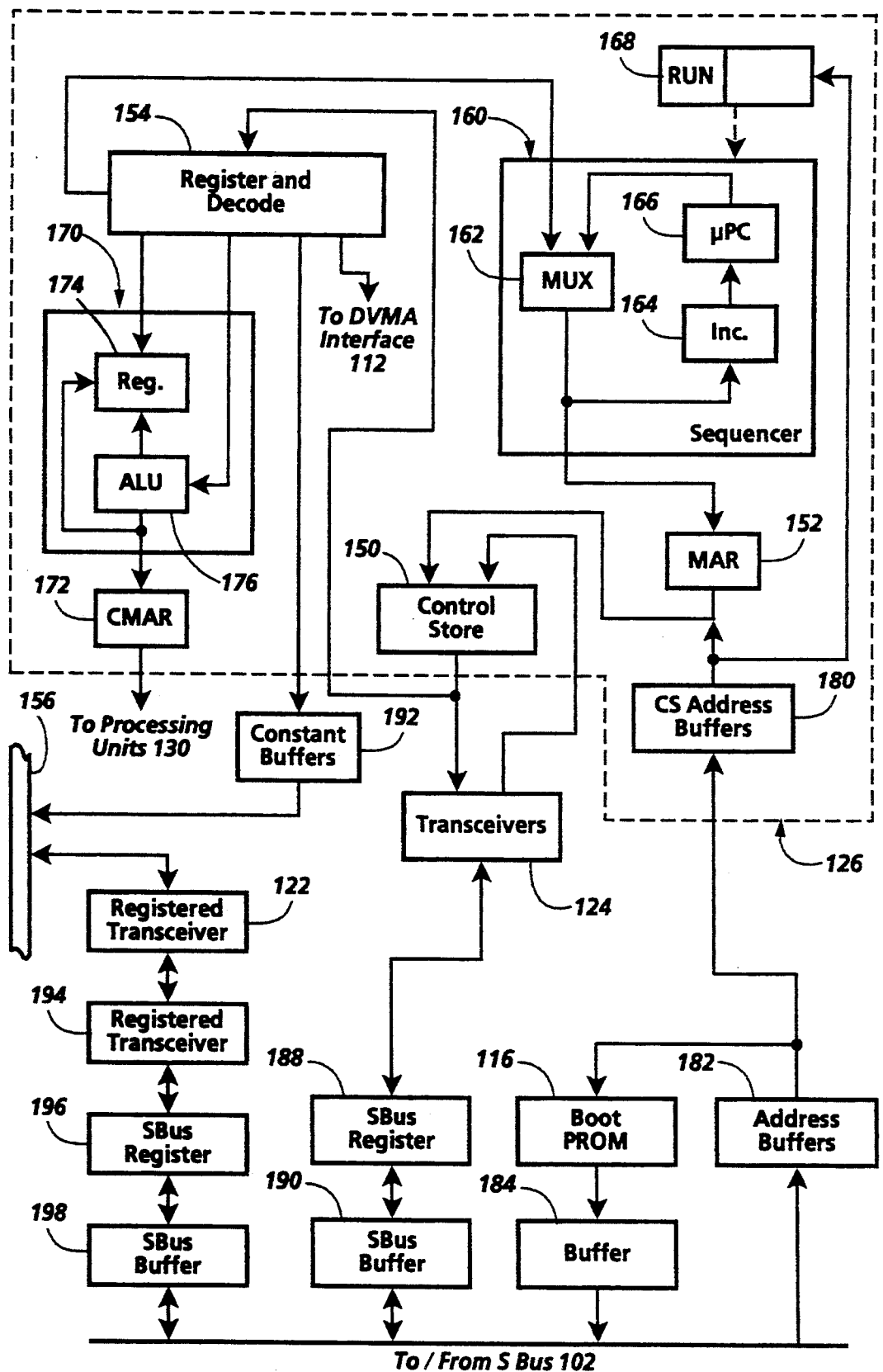
FIG. 4 is a schematic block diagram showing components of the control circuitry of FIG. 3.
Figure 5:
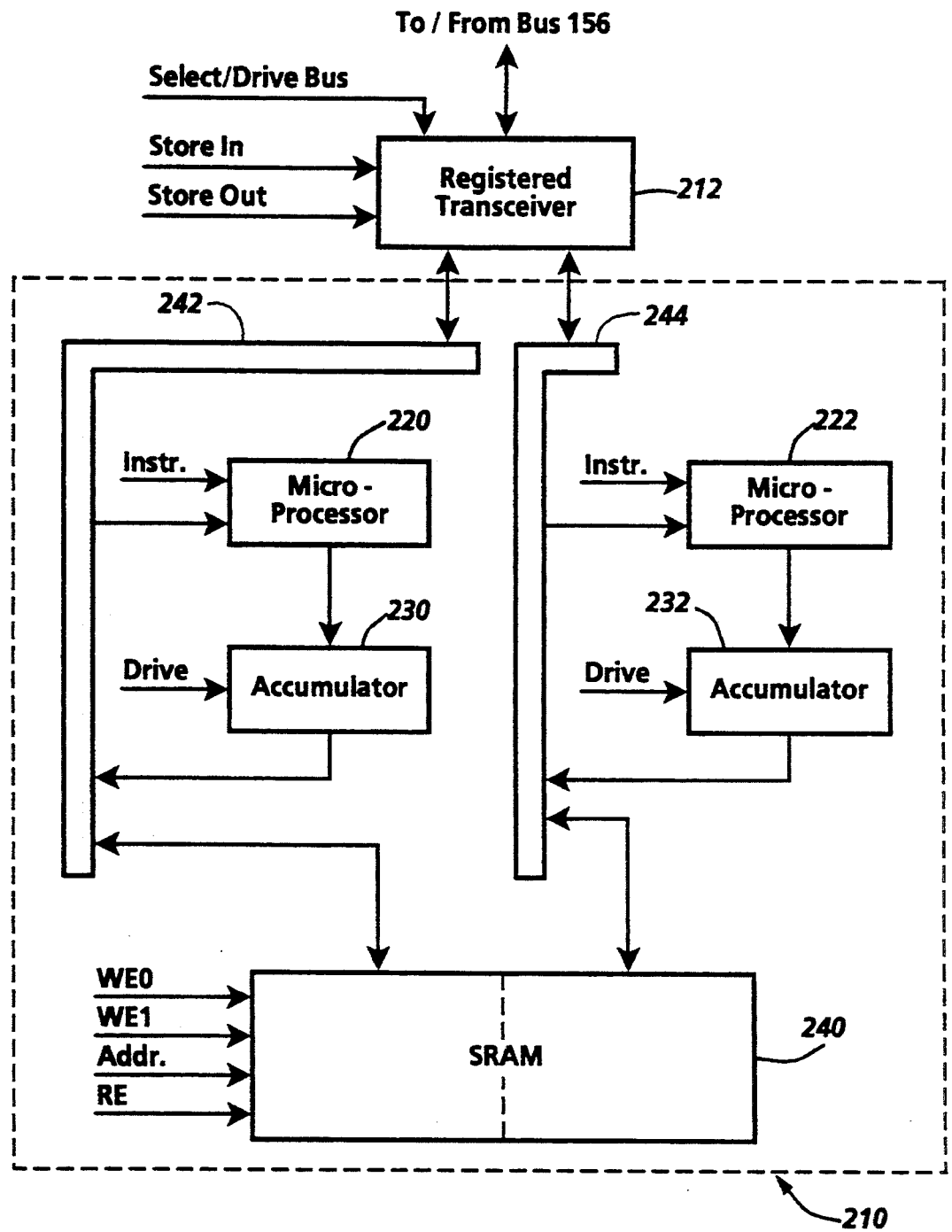
FIG. 5 is a schematic block diagram showing components of a processing unit in FIG. 3.
Figure 6:
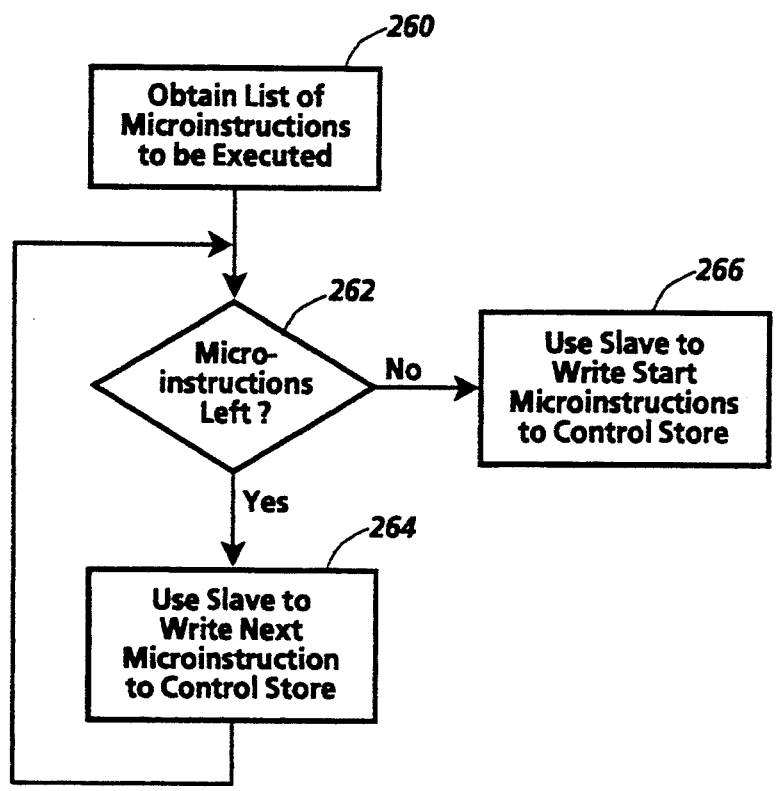
FIG. 6 is a flow chart showing general acts in loading microinstructions in a control store in FIG. 4.
Figure 7:
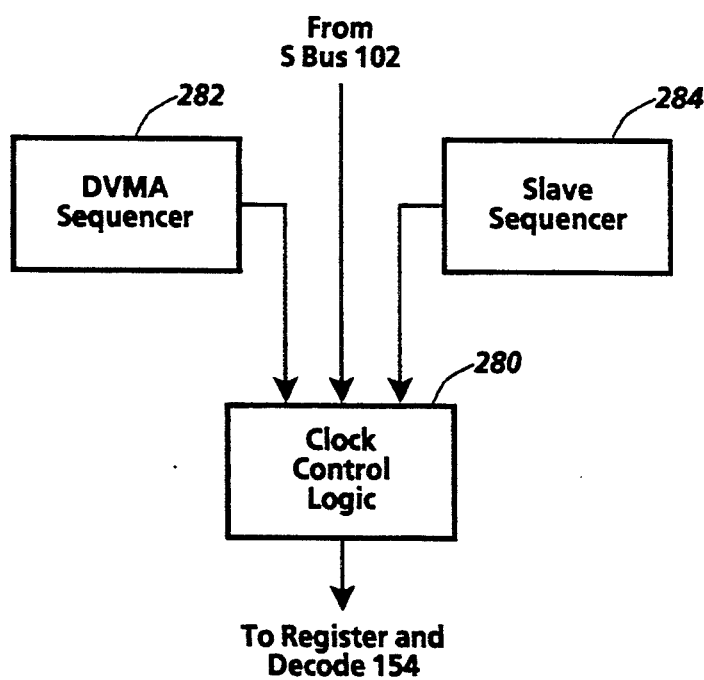
FIG. 7 is a schematic block diagram showing components that control clock signals to a box in FIG. 3.

FIG. 3 shows general components of the implementation and their connections to components in the host workstation. FIG. 4 shows components of the control circuitry in FIG. 3. FIG. 5 shows components of a processing unit in FIG. 3. FIG. 6 shows general acts in writing microinstructions to the control store in FIG. 4. FIG. 7 shows components that provide clock signals to components shown in FIGS. 4 and 5 for microinstruction execution.

FIG. 3 shows an implementation in which SPARCStation 100 serves as a host. SPARCStation 100 includes SBus 102, to which are connected central processing unit (CPU) 104, memory 106, and input/output (I/O) devices 108. Memory 106 has sufficient capacity to store image data defining several full size images, each requiring at least i megabyte of memory. Memory 106 can also store instruction data indicating conventional instructions CPU 104 can execute to perform operations on the image data, including compression, decompression, and other image manipulation operations. I/O devices 108 may include scanners, printers, modems, displays, disk drives, network connections, and other sources and destinations of data defining images.

Mounted in SPARCStation 100 is interface card 110, a printed circuit board on which are mounted components that form direct virtual memory access (DVMA) interface 112, slave interface 114, and boot PROM 116, a programmable read-only memory component. Interface card 110 also holds conventional connectors (not shown) for mounting card 110 into SPARCStation 100 and for providing an electrical connection to SBus 102. Interface board also holds conventional connectors (not shown) to which cable 118, which may be as short as 12 inches, can be mounted to provide an electrical connection to box 120. Circuitry (not shown) formed on a surface of interface card 110 provides electrical connections between the connectors and DVMA interface 112 and slave interface 114 and between slave interface 114 and boot programmable read only memory (PROM) 116.

DVMA interface 112, a master interface, and slave interface 114 can be implemented in accordance with SBus Specification B.O, Sun Microsystems, Inc. Part No. 800-5922-10, 1990, which describes signal protocols for SBus master and slave interfaces. Each interface can have a respective sequencer. In addition, as described below, card 110 includes a number of components that provide signals to components in box 120 or receive signals from components in box 120, thus performing functions of DVMA interface 112 or slave interface 114.

Boot PROM 116 can be an 8K×8 bit memory accessible by slave interface 114, which is only capable of byte reads from boot PROM 116 and of single word control store accesses.

Box 120 includes a printed circuit board with conventional connectors (not shown), to which cable 118 can be mounted to provide electrical connections to DVMA interface 112 and slave interface 114. Circuitry formed on the surface of the board (not shown) provides electrical connections from the connectors to components on the board, including registered transceiver 122, transceivers 124, and control circuitry 126. Registered transceiver 122, designated A, is further connected to interconnecting circuitry 128, which interconnects processing units 130. Transceivers 124, designated B-E, are connected through parallel lines to control circuitry 126. These transceivers can be implemented with conventional 32 bit bidirectional transceivers.

Box 120 also includes power supply 140, which can be a conventional power supply capable of providing approximately 40 amps at 5 volts, or 200 watts. Box 120 also contains a cooling fan (not shown).

The arrangement shown in FIG. 3 solves several problems in using a host workstation: For a SPARCStation, the card size and constraints on space, power consumption, signal loadings, and heat dissipation make it infeasible to include an entire SIMD parallel processor on a single card; therefore, box 120 includes the processing units, control circuitry, and most of the interconnecting circuitry, and card 110 includes only a small number of components that provide a connection between box 120 and SBus 102. In addition, dividing components into two modules in this way would allow card 110 to be replaced with an interface to another computer without significantly changing box 120. Finally, the extra space provided by box 120 facilitates debugging.

FIG. 4 shows components within control circuitry 126 and their connections to other components. In addition to the components shown, control circuitry 126 includes a conventional clock driver (not shown) for receiving and distributing the clock signal of SBus 102 at a frequency of 25 MHz, i.e. one cycle per 40 nsec, so that it can drive several components. The circuitry is designed so that control circuitry 126 can perform each possible instruction in one 40 nsec cycle. In other words, a new microinstruction and microinstruction address should be provided at each clock tick.

Control store 150 can be a 16K×128 bit static random access memory (SRAM) for storing microinstructions received from SBus 102. Upon receiving a microinstruction's address from memory address register (MAR) 152, a conventional register, control store 150 provides the microinstruction to microinstruction register and decode 154. Register and decode 154 provides various control signals, including instructions to the processing circuitry of each processing unit and buffer select signals to control transfer of data on common data bus 156.

Microcode sequencer 160 loads addresses into MAR 152. Multiplexer (MUX) 162 selects either a jump address from register and decode 154 or the address that immediately follows the previous address, generated by incrementer 164 and microprogram counter ($\mu$PC) 166. Sequencer 160 can be implemented with an IDT49C410 microprogram sequencer, described in 1990/1991 *Logic Databook*, Integrated Device Technology, Inc., Santa Clara, Calif., 1990, sections 5.4 and 7.4. Sequencer 160 can receive its opcodes directly from register and decode 154.

Control/status register 168 is a conventional register whose most significant bit, called the RUN bit, indicates whether sequencer 160 should perform normal addressing or should provide a special address that holds the coprocessor. The IDT49C410 sequencer has a JumpZero instruction to which it responds by providing the address of location 0 to MAR 152. Therefore, the special address can be location 0, and the microinstruction at location 0 in control store 150 can in general be a nonoperative (no-op) instruction that is repeatedly retrieved until the microprogram is ready to execute.

The RUN bit can be cleared by the SBus reset signal when SPARCStation 100 is reset. Slave interface 114 can also read or write control/status register 168, which could include only the RUN bit. The address space addressed by CS address buffers 180 can be divided so that only the first few bits of an address are used to decode whether the address is that of control/status register 168.

As suggested by the dashed line from control/status register 168 to sequencer 160, the RUN bit is not provided directly to sequencer 160, but is received by register and decode 154, which then responds appropriately. While the RUN bit is set, register and decode 154 receives in each cycle a microinstruction fetched from control store 150 and, in the next cycle, decodes the microinstruction and executes it by providing control signals to other components. Upon detecting that the RUN bit has been cleared, however, register and decode 154 provides a JumpZero instruction to sequencer 160 and ignores whatever microinstruction has been fetched in the previous cycle.

After a microprogram has been stored in control store 150, execution of the microprogram can be caused by writing a microinstruction to location 0 that, when executed, provides the starting address of the microprogram to sequencer 160 and again sets the RUN bit so that sequencer 160 can begin normal addressing. Since the microinstruction from location 0 is fetched from control store 150 twice before the first instruction of the microprogram is fetched, every microprogram should begin with a no-op instruction that provides a "Continue" opcode to sequencer 160. This causes incrementer 164 to increment the address in $\mu$PC 166, beginning normal address incrementing.

The final operation of each microprogram can write a completion code to a location in SPARCStation memory, and whenever the SPARCStation sees the completion code, it can clear the RUN bit. Until the RUN bit is cleared, the microprogram can perform a no-op loop or, alternatively, the microprogram itself could clear the RUN bit after writing the completion code.

Address processor 170 loads addresses into cache memory address register (CMAR) 172, connected to provide an address to each processing unit. The previous address provided to CMAR 172 can be stored in register 174. Alternatively, an address from register and decode 154 can be loaded directly into register 174. ALU 176 can then operate on the value in register 174 to obtain the next address. Address processor 170 can be implemented with an IDT49C402B microprocessor, described in 1990/1991 *Logic Databook*, Integrated Device Technology, Inc., Santa Clara, Calif., 1990, sections 5.3 and 7.2. Register 174 can be the Q register or any of the other internal registers of address processor 170. Register and decode 154 can provide instructions, register specifiers, a carry signal, and addresses to address processor 170, and can also provide a write enable signal to the memory circuitry of one or more processing units.

Control store address buffers 180 are connected to receive addresses from address buffers 182 in slave interface 114 on interface card 110. This provides a path through which CPU 104 in SPARCStation 100 can provide an address to control store 150. Also, SBus 102 can provides two address bits through this path that are hardwired to logic that write enables 32 bits of SRAM or one 32 bit bank of SRAM at a time; since only one 32 bit word at a time can be received from SBus 102.

Each of transceivers 124 is connected to provide 32 bits to SBus register 188 on interface card 110, which in turn can provide data to SBus buffer 190, all of which can be implemented with conventional 32 bit components. This circuitry provides a path through which one 32 bit segment at a time of a 128 bit microinstruction in control store 150 can be read to SBus 102, one of the functions of slave interface 114.

Transceivers 124 are also connected to receive data from SBus register 188, which in turn receives data from SBus 102 through SBus buffer 190. Therefore, this circuitry also provides a path through which a microinstruction from SBus 102 can be loaded into control store 150, another function of slave interface 114.

In addition to providing addresses for control store 150 and for control/status register 168, address buffers 182 also provide addresses to boot PROM 116. Boot PROM 116 is read at boot time to identify card 110. Therefore, it begins at address 0 relative to its SBus slot. Boot PROM 116 stores data that indicates FCode instructions that can be executed by CPU 104 during boot to obtain data indicating an identifier of card 110, including what kind of card it is and which revision; indicating address space parameters; and indicating what driver should be loaded to communicate with card 110. These instructions can be written according to conventional techniques using the instructions set forth in SBus Specification B.O, Sun Microsystems, Inc. Part No. 800-5922-10, 1990, Appendix C, pp. 143-168, entitled "FCode Reference." Each instruction from boot PROM 116 is provided to SBus 102 through buffer 184.

Boot PROM 116 is read using byte accesses. If CPU 104 tries to read a 32 bit word during boot time, slave interface 112 responds by returning a byte response on Ack[2:0], causing CPU 104 to read one byte at a time. Boot PROM 116 drives only the most significant byte of the SBus data line.

FIG. 4 also shows constant buffers 192, a set of buffers through which register and decode 154 can provide data to common data bus 156. Common data bus 156 is also connected to processing units 130 and is therefore a part of interconnecting circuitry 128 in FIG. 3.

As shown, common data bus 156 is also connected to receive data from SBus 102 and provide data to SBus 102 through registered transceiver 122, designated A in FIG. 3. Transceiver 122 is connected to provide 32 bits to registered transceiver 194 on interface card 110, which in turn can provide data to SBus register 196 and SBus buffer 198, all of which can be implemented with conventional 32 bit components. This circuitry provides a path through which an item of data can be transferred from a processing unit to SBus 102, one of the functions of DVMA interface 112.

Transceiver 122 is also connected to receive data from registered transceiver 194, which in turn receives data from SBus 102 through SBus register 196 and SBus buffer 198. Therefore, this circuitry also provides a path through which an item of data can be transferred from SBus 102 to a set of processing units, another function of DVMA interface 112.

Register and decode 154 is also connected to provide some control signals directly to DVMA interface 112 on card 110. As a result, a microinstruction can provide signals to DVMA interface 112 so that it acts as a master on SBus 102.

FIG. 5 shows processing unit 210, the pth one of processing units 130, together with respective registered transceiver 212. Registered transceiver 212 provides a connection through which processing unit 210 receives data from common data bus 156 and provides data to common data bus 156. Therefore, registered transceiver 212 is a part of interconnecting circuitry 128 in FIG. 3. Registered transceiver 212 can be implemented with a 32 bit set of conventional registered transceivers, such as four 8 bit 74FCT651 transceivers from Integrated Device Technology, Inc., or any equivalent circuitry, such as two 16 bit transceivers. Registered transceiver 212 responds to signals from register and decode 154 by storing data from bus 156; by storing data from buses 242 and 244; by driving bus 156; or by driving buses 242 and 244.

Processing unit 210 includes microprocessors 220 and 222, each of which can be implemented with an IDT49C402B microprocessor, described in 1990/1991 Logic Databook, Integrated Device Technology, Inc., Santa Clara, Calif., 1990, sections 5.3 and 7.2. In this implementation, each microprocessor includes an arithmetic logic unit (ALU), a Q register, a 64-register bank, and internal shift logic so that registers can be cascaded to form very long shift registers. An array of P processing units, each with two 16 bit microprocessors, can thus load, store, or operate on 32*P bits per clock cycle. All the microprocessors can receive signals indicating instructions in parallel from register and decode 154.

Accumulators (ACC) 230 and 232 are connected to receive data output by microprocessors 220 and 222, respectively. Accumulators 230 and 232 are necessary because microprocessors 220 and 222 do not produce cache write data quickly enough. In addition, accumulators 230 and 232 make it possible to perform an operation while shifting a microprocessor's Q register, because the output from each microprocessor's ALU can be stored in its accumulator and then fed back to the microprocessor's data input during the next cycle. Each accumulator can be implemented with a conventional 16 bit register with tri-state outputs. The accumulators are controlled in parallel by signals from register and decode 154 indicating whether to provide output.

Processing unit 210 also includes static RAM (SRAM) 240, a 64K×32 bit memory, connected through internal buses 242 and 244 so that 16 bits of each data unit are accessible by microprocessor 220 and the other 16 bits are accessible by microprocessor 222. SRAM 240 can be implemented with a Motorola MCM3264 module. An array of P processing units, each with one such memory module, can thus store a total of P*2M bits of data. SRAM 240 and each of the other memory modules receives addresses in parallel from CMAR 172, and each memory module also receives write enable signals and read enable signals from register and decode 154. Signals from register and decode 154 can write enable or read enable both halves of a data unit, and separate signals can also indicate write enables to each half of each data unit. SRAM 240 can be managed as a cache memory.

As shown, internal buses 242 and 244 are each connected to registered transceiver 212 and to SRAM 240. In addition, bus 242 is connected to receive data from accumulator 230 and to provide data to processor 220, while bus 244 is connected to received from accumulator 232 and to provide to processor 222. Data transfer on internal buses 242 and 244 is controlled by signals from register and decode 154 to registered transceiver 212, to accumulators 230 and 232, and to SRAM 240 indicating which source should drive the buses. The signal to SRAM 240 is a read enable signal as mentioned above.

Data can be transferred from SBus 102 to either of microprocessors 220 and 222 by first writing the data into SRAM 240 through the respective internal bus 242 or 244. Then the data is read onto the respective internal bus 242 or 244 and the microprocessor executes an instruction causing it to read data from the internal bus. Rather than following this path, data could be provided more directly to each microprocessor. For example, register and decode 154 could be connected to a separate transfer enable line for each microprocessor, so that data from bus 102 could be written directly to each microprocessor.

If SRAM 240 is implemented with a dual port memory component, rather than a single port component as shown, microprocessors 220 and 222 can be connected to one memory port and registered transceiver 212 can be connected to the other. Write accesses from the microprocessors and from registered transceiver 212 can be synchronized to prevent collisions.

Register and decode 154 includes logic that produces control signals in response to microinstructions from control store 150 according to conventional techniques. The microinstructions could be encoded in a wide variety of ways. For example, each microinstruction could include a three bit field indicating a source to drive bus 156; a two bit field indicating a source to drive buses 242 and 244; a six bit field indicating which SRAMs are write enabled; a ten bit field indicating an instruction for the microprocessors; two six bit fields indicating microprocessor A register and B register, respectively; a two bit field to set microprocessor carry inputs; a ten bit field indicating an instruction for address processor 170; two six bit fields indicating A register and B register, respectively, in address processor 170; a four bit field indicating an instruction for sequencer 160; a two bit field that selects a source for a single bit that controls whether a branch is taken; a single bit field indicating loading of µPC 166 in sequencer 160; a single bit field indicating the carry in of sequencer 160; a single bit field indicating the carry in of address processor 170; and a sixteen bit field indicating a constant for sequencer 160, address processor 170, or the microprocessors.

In FIG. 6, the act in box 260 obtains a list of microinstructions to be executed. Host CPU 104 can, for example, obtain a list by retrieving a list from memory 106 or by executing instructions that produce a list.

The act in box 262 begins an iterative operation that loads each microinstruction into control store 150. During the act in box 264 for each iteration, slave interface 114 writes a microinstruction into control store 150. Host CPU 104 can, for example, provide an address to address buffers 182 and a series of four 32 bit microinstruction segments to SBus buffer 190, together with signals to a sequencer in slave interface 114 requesting each 32 bit microinstruction segment be loaded at the address.

In response to the request, slave interface 114 can provide control signals to transfer each microinstruction segment in the series to SBus register 188 and to a respective one of transceivers 124. Each microinstruction is received in four 32 bit segments, and each 32 bit segment is written to control store 150 as it is received. Slave interface 114 can also provide control signals to transfer the address to CS address buffers 180 and to control the output from MAR 152 so that the address in CS address buffers 180 is presented at the address port of control store 150. Slave interface 114 can also provide signals to write enable 32 bits of SRAM in control store 150. Then, slave interface 114 can provide a write signal to control store 150 so that a 32 bit segment of the microinstruction is written into the write enabled 32 bits at the address in CS address buffers 180.

A special start sequence of microinstructions can be written into an appropriate location in control store to start execution of a list of microinstructions. Therefore, when the list is completely written into the control store, the act in box 266 is performed, during which slave interface 114 writes the start sequence.

When the RUN bit is clear, as described above, sequencer 160 can repeatedly receive a JumpZero instruction, so that it repeatedly fetches a no-op microinstruction at location 0. The start sequence can therefore be written by writing a JUMP-to-location-n microinstruction to location 0, where n is the starting location of the microinstructions to be executed next. Subsequently, the RUN bit can be set by slave interface 114 in response to the current SBus master.

Due to pipelining, each JUMP microinstruction affects two cycles, the first to obtain and latch the address of the next microinstruction into MAR 152 and the second to fetch the microinstruction at the address in MAR 152. Therefore, the address in MAR 152 is that of location 0 until the JUMP-to-location-n microinstruction is executed, and as a result of the preceding JUMP-to-location-0 microinstruction, the JUMP-to-location-n microinstruction is again fetched from location 0.

Because the JUMP-to-location-n microinstruction is fetched twice, it is executed twice. Each time it is executed, the microinstruction at location n is fetched. Therefore, the microinstruction at location n is also executed twice, and it can be a processor no-op that provides a "Continue" opcode to sequencer 160, causing sequencer 160 to start incrementing the address so that the microinstruction at location n+1 is fetched, and so forth.

Before the act in box 260 and after the act in box 266, host CPU 104 can perform any of a wide variety of activities. For example, if host CPU 104 is managing a queue of lists of microinstructions, each to be loaded to control store 150 in the manner shown in FIG. 6, CPU 104 can maintain the queue and perform any operations necessary to obtain subsequent lists on the queue. CPU 104 can also perform operations to determine whether the next list on the queue is already loaded into control store 150, in which case it need not be loaded again, but can be called by loading a JUMP-to-location-n microinstruction as in the act in box 266. Host CPU 104 can perform multitasking, in which case it can perform other tasks after loading a list of microinstructions. Or it could wait for execution of the list to be completed or for an interrupt from the coprocessor.

FIG. 7 illustrates components that control clock signals so that a microinstruction can be loaded into control store 150 without interfering with execution of a previous microinstruction. Clock control logic 280 on card 110 receives clock signals from SBus 102, as do other components on card 110 including DVMA sequencer 282, slave sequencer 284, and SBus register 188. Clock control logic 180 always provides a clock signal to components in box 120, unless it receives a signal from DVMA sequencer 282 or from slave sequencer 284 indicating clock signals should not be provided to box 120. For example, whenever slave sequencer 284 is providing control signals to load a microinstruction into control store 150, it provides a signal to clock control logic 180 to prevent clock signals. In general, DVMA sequencer 282 stops clock signals when DVMA sequencer 282 either is attempting to gain control of SBus 102 as indicated by a Bus Grant signal from an SBus arbiter or is awaiting a signal from slave sequencer 284 on the SBus Ack[2:0] lines.

Each clock signal from clock control logic 280 goes to register and decode 154 and can also go directly or via register and decode 154 to any other component in box 120 that requires a clock signal. Register and decode 154 responds to a clock signal by decoding a microinstruction read from control store 150. Other components that include registers must also receive clock signals. For example, in the implementation of FIGS. 4 and 5, sequencer 160, address decoder 170 and microprocessors 220 and 222 must receive clock signals because of their internal registers. Similarly, registered transceivers 122, 194, and 212; MAR 152; CMAR 172; SBus registers 188 and 196; and accumulators 230 and 232 must receive clock signals although, as noted above, SBus register 188 can receive clock signals directly from SBus 102. Some other components may be implemented to require clock signals, such as control store 150 and SRAM 240; these components may also be implemented so that no clock signal is required, but with register and decode 154 providing read enable and write enable signals. A sequence of several clock signals may all involve a single microinstruction, from obtaining its address to storing data in SRAM 240 in response to its execution.

In addition to the general implementation features above, a number of features specific to this invention are set forth below. Further implementation features are described in copending coassigned U.S. patent application 07/993,218, entitled "SIMD Architecture with Bus for Transferring Data to and from Processing Units" ("the Common Bus application"), and 07/993,256, entitled "SIMD Architecture for Connection to Host Processor's Bus" ("the Bus Master application"), both incorporated herein by reference.

D. General Application Features

The general implementation features described above could be used in a wide variety of data processing applications. They are expected to be particularly useful, however, in performing some types of image processing more rapidly than they could be performed on a serial processor. In particular, the features described above could be used to implement techniques similar to those described in Serra, J., *Image Analysis and Mathematical Morphology*, Academic Press, 1982 and Serra, J., *Image Analysis and Mathematical Morphology, Volume 2: Theoretical Advances*, Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to implement basic image processing operations, such as reduction, enlargement, conversion of an image between multi-bit pixels such as gray scale or color and binary pixels, and rotation.

As shown in this application and the other applications incorporated herein by reference, the implementation described above provides a one-dimensional SIMD array of processing units. Each processing unit can perform operations for one or more full height columns of pixels from an image. Each processing unit can operate on items of data in horizontal format, eliminating the need for corner turning operations between the host and the parallel processor.

The general implementation features described above may also be useful in various other applications, such as searching an image database for images containing a particular set of features; scanning envelopes for addresses; interpreting forms from a high-speed scanner; machine vision; and process-specific print image correction and verification.

E. Specific Implementation Features

Figure 8:
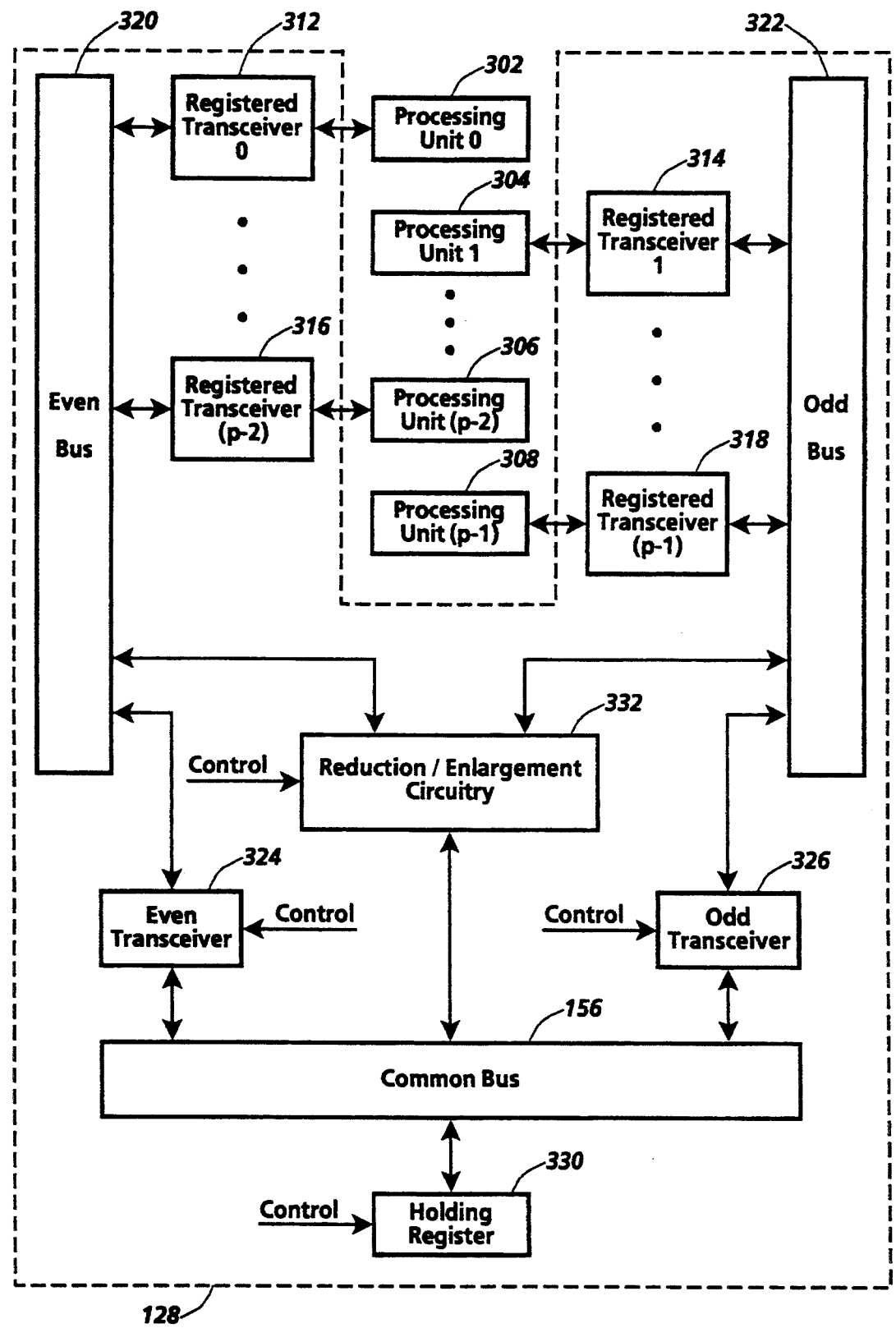
FIG. 8 is a schematic block diagram showing an example of subsampling/spreading circuitry and data transfer circuitry that could be included in the interconnecting circuitry of FIG. 3.
Figure 9:
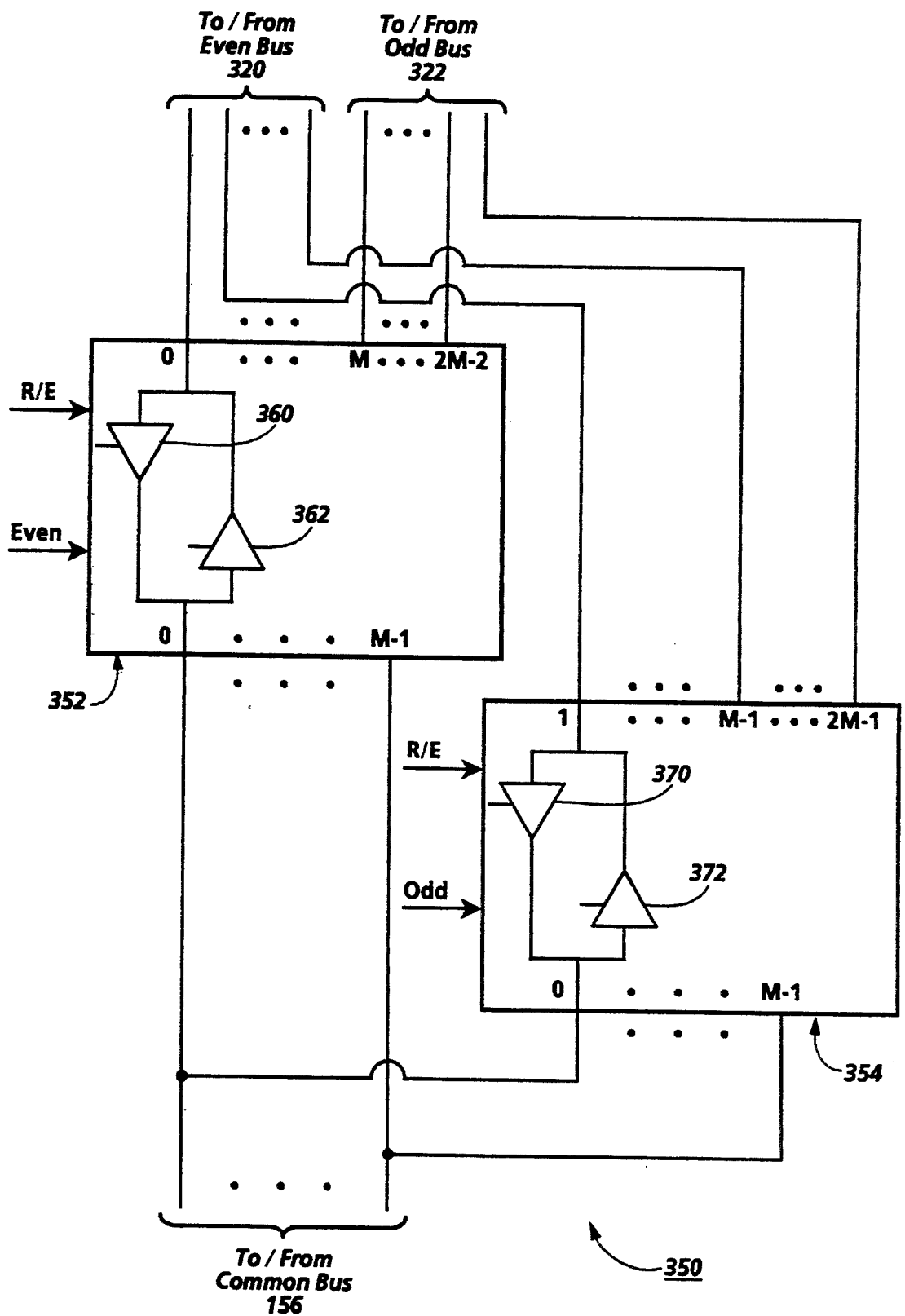
FIG. 9 is a schematic block diagram showing one example of how the reduction/enlargement circuitry of FIG. 8 could be implemented.
Figure 10:
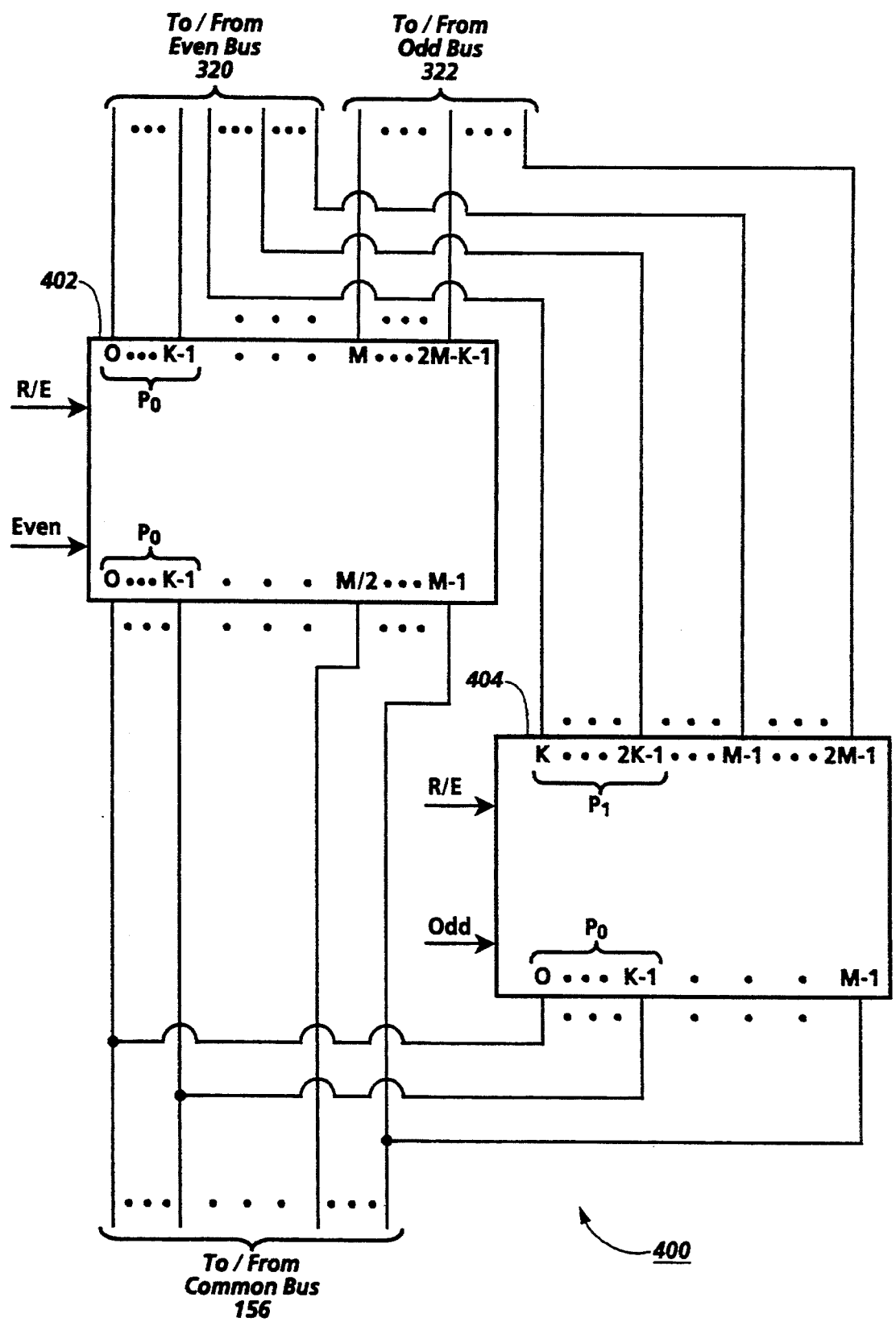
FIG. 10 is a schematic block diagram showing another example of how the reduction/enlargement circuitry of FIG. 8 could be implemented.
Figure 11:
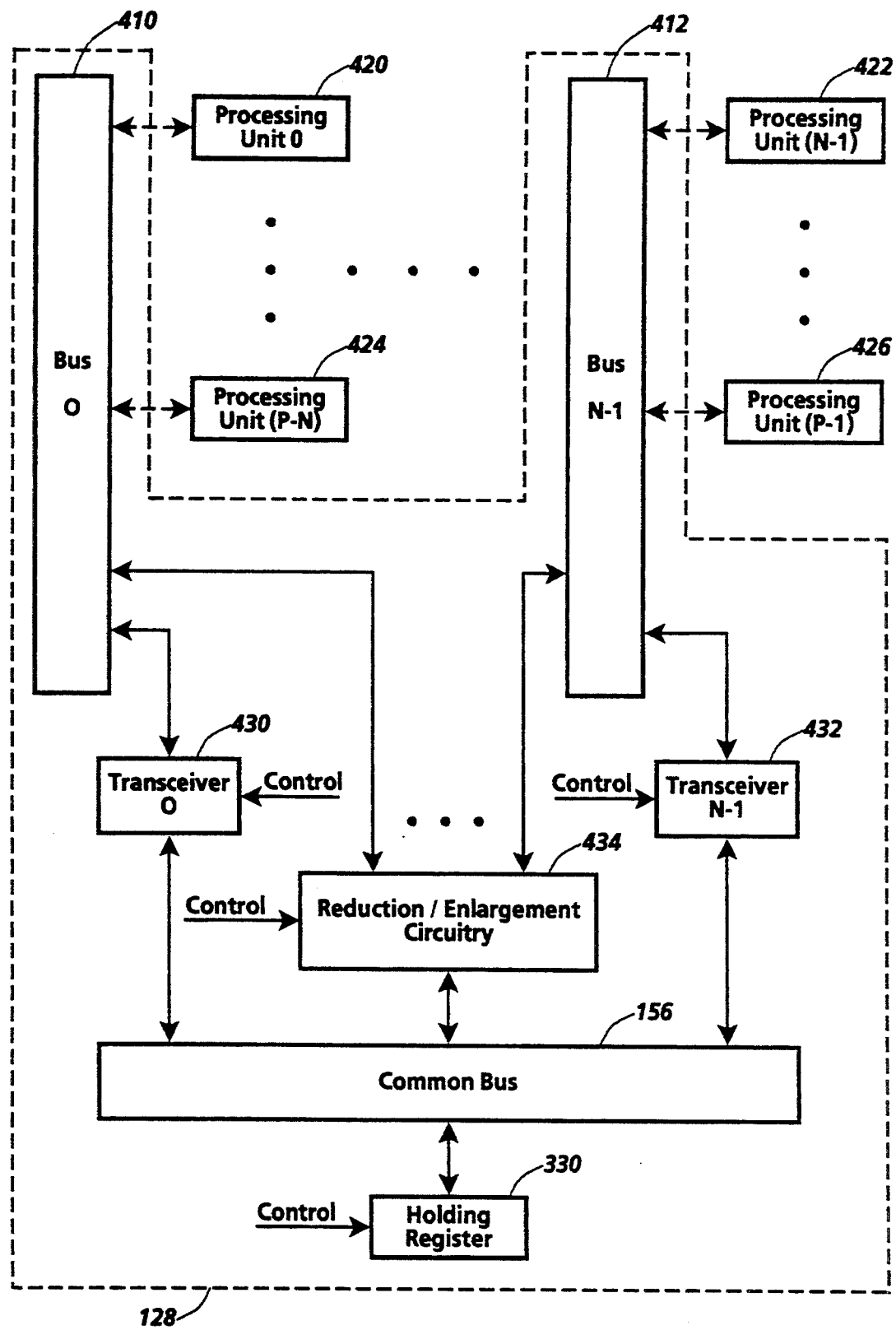
FIG. 11 is a schematic block diagram showing another example of subsampling/spreading circuitry and data transfer circuitry that could be included in the interconnecting circuitry of FIG. 3.
Figure 12:
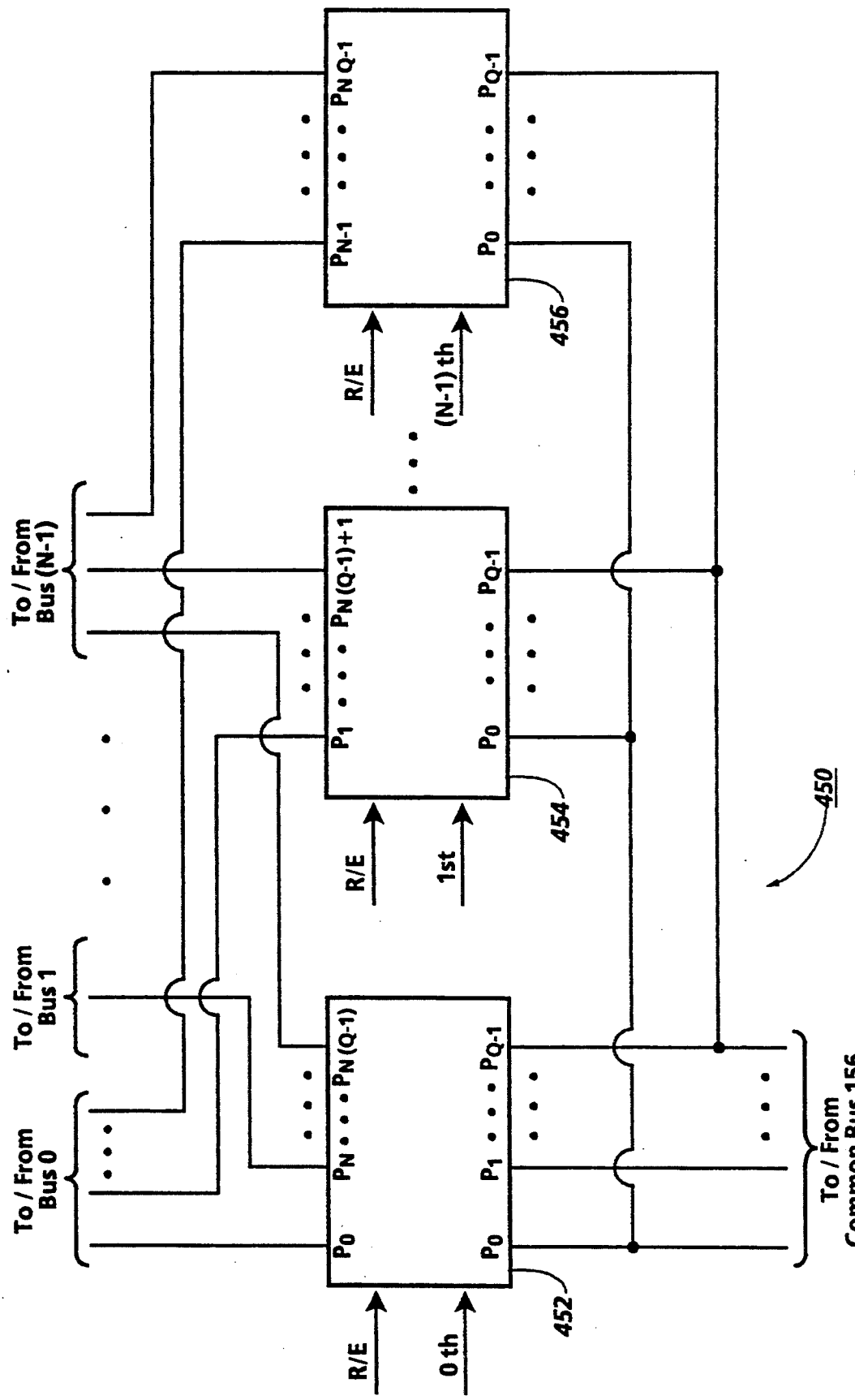
FIG. 12 is a schematic block diagram showing an example of how the reduction/enlargement circuitry of FIG. 11 could be implemented.
Figure 13:
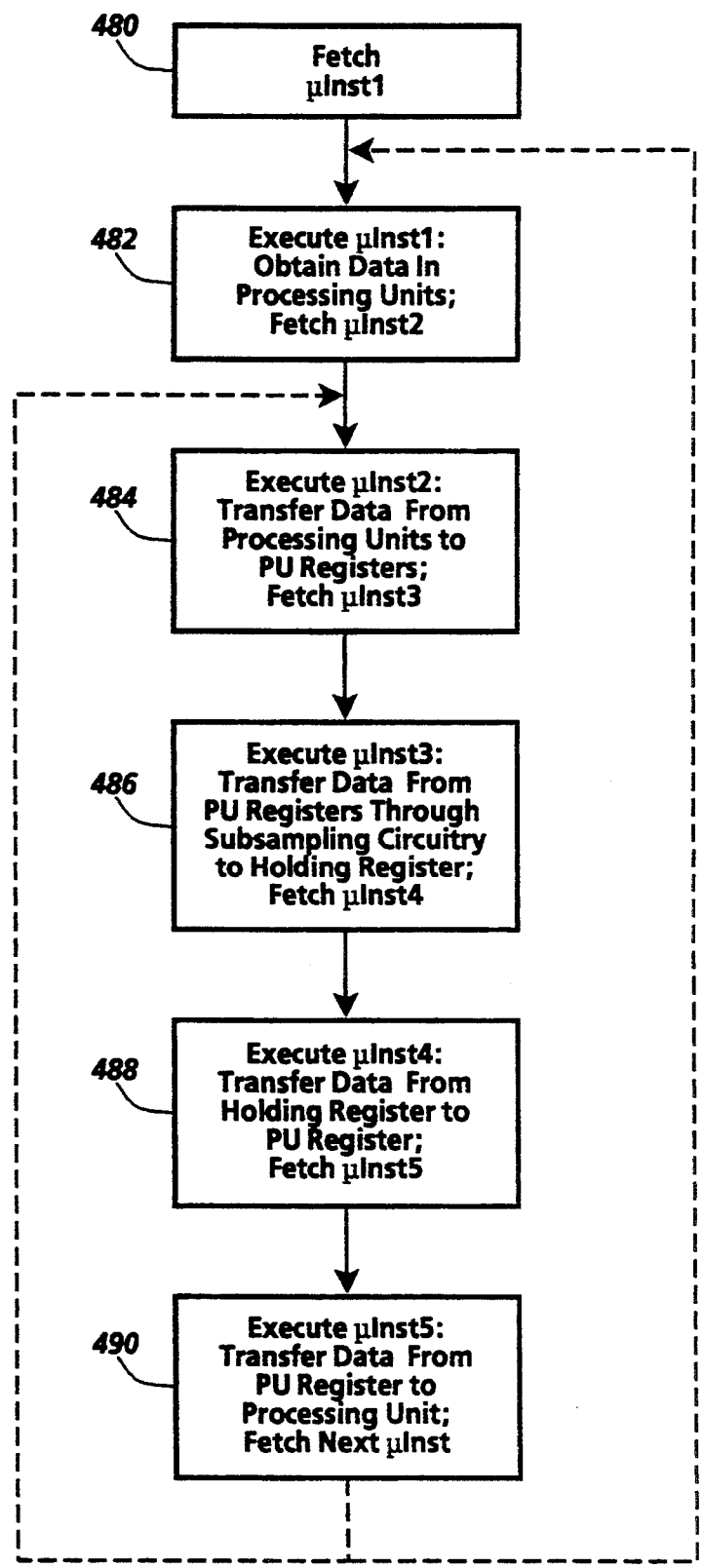
FIG. 13 is a flow chart showing clock cycles in a subsampling operation.
Figure 14:
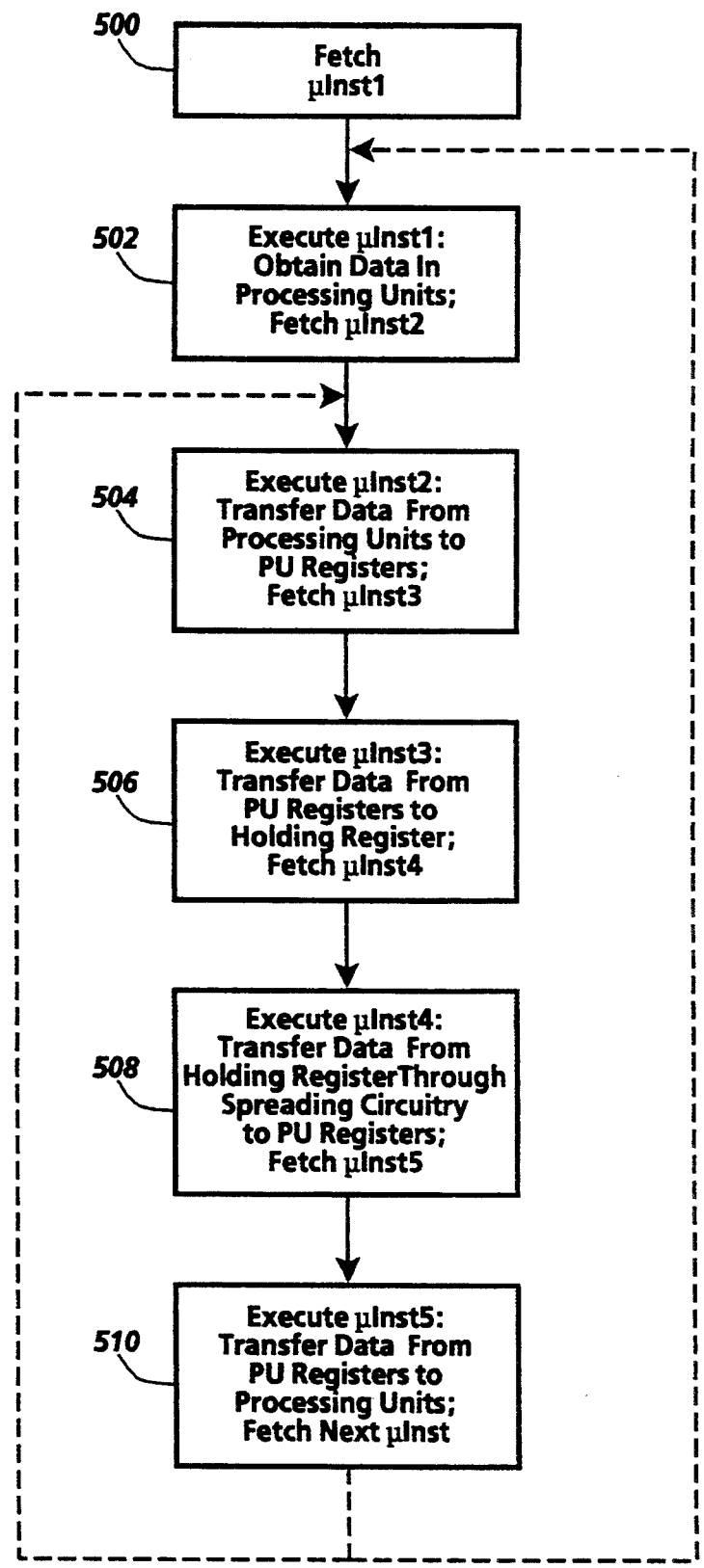
FIG. 14 is a flow chart showing clock cycles in a spreading operation.

FIGS. 8–14 show how the general implementation features described above could be used to implement the invention. FIGS. 8–10 show features of an implementation with an even bus and an odd bus, each connected to half of the processing units. FIGS. 11 and 12 show features of an implementation with N buses, each connected to 1/N of the processing units. FIGS. 13 and 14 show acts performed in executing sequences of microinstructions to perform subsampling and spreading operations.

1. Even Bus and Odd Bus

FIG. 8 shows an implementation of interconnecting circuitry 128 in FIG. 3 in which an even bus and an odd bus can transfer data between the processing units and reduction/enlargement circuitry. FIG. 9 shows a component that can be used to operate on binary pixels in the reduction/enlargement circuitry of FIG. 8. FIG. 10 shows a component that can be used to operate on K-bit pixels in the reduction/enlargement circuitry of FIG. 8.

FIG. 8 shows processing units 302, 304, 306, and 308, four of an array of p processing units. Interconnecting circuitry 128 includes registered transceivers 312, 314, 316, and 318, one for each processing unit. The processing units and the respective registered transceivers can be implemented as described above in relation to FIG. 5.

Processing units 302 through 308 form two groups, even and odd. Processing unit 302, numbered zero, is the first of the even processing units, while processing unit 306, numbered (p-2), is the last of the even processing units. Processing unit 304, numbered one, is the first of the odd processing units, while processing unit 308, numbered (p-1), is the last of the odd processing units. Each even processing unit's respective registered transceiver is connected to even bus 320 and each odd processing unit's respective registered transceiver to odd bus 322. Even bus 320 is in turn connected to common bus 156 through even transceiver 324 and odd bus 322 is connected through odd transceiver 326. Buses 156, 320, and 322 can be implemented with conventional 32 bit bus circuitry, and register and decode 154 can provide signals to control data transfer on the buses as described below. Transceivers 324 and 326 can be implemented with conventional 74FCT245 integrated circuits from Integrated Device Technology, Inc., or any equivalent circuitry.

Register and decode 154 can select any of several sources for each of the buses.

The sources for common bus 156 include even transceiver 324, odd transceiver 326, and holding register 330. In addition, common bus 156 can receive from components in reduction/enlargement circuitry 332.

The sources for even bus 320 include registered transceivers 312 through 316, the registered transceivers of the even processing units. In addition, even bus 320 can receive from reduction/enlargement circuitry 332 and even transceiver 324.

Similarly, the sources for odd bus 322 include registered transceivers 314 through 318, the registered transceivers of the odd processing units. In addition, odd bus 322 can receive from reduction/enlargement circuitry 332 and odd transceiver 326.

Holding register 330 can be used to store data from common bus 156 during one cycle and then to provide the stored data to common bus 156 for transmission to another component during a subsequent cycle. Holding register 330 could be implemented with a conventional 32 bit register. Specialized implementations of holding register 330 are described in copending coassigned U.S. Patent Applications 07/993,169, now abandoned, entitled "One Dimensional SIMD System for Performing Orthogonal Rotations," 07/994,490, entitled "One Dimensional SIMD System with Buffers for Performing Orthogonal Rotations," and 07/993,286 entitled "Edge Crossing Circuitry for SIMD Architecture," all incorporated herein by reference.

In addition to the signals described above in relation to FIGS. 4 and 5, register and decode 154 provides control signals to even transceiver 324, odd transceiver 326, holding register 330, and reduction/enlargement circuitry 332. The control signals to even transceiver 324 and odd transceiver 326 can indicate when each transceiver should drive the respective even or odd bus from common bus 156 or vice versa. The control signals to holding register 330 can indicate when it should store data from common bus 156 and when it should drive common bus 156 with previously stored data. Control signals for reduction/enlargement circuitry 332 and operations performed in response to such control signals are described in greater detail below.

Reduction/enlargement circuitry 332 can include various kinds of circuitry. For example, it can include circuitry for performing 2:1 reduction on a data item obtained from even bus 320 and odd bus 322. It can also include circuitry for performing 1:2 enlargement on a data item obtained from common bus 156. And reduction/enlargement circuitry 332 can include plural components connected in parallel, such as components appropriate for different pixel lengths.

FIG. 9 shows component 350 for performing 2:1 reduction and 1:2 enlargement on binary pixels. Component 350 includes bidirectional transceivers 352 and 354, each connected between common bus 156 on one side and even bus 320 and odd bus 322 on the other side. Transceivers 352 and 354 could each be implemented with a standard transceiver such as a 74FCT245 or equivalent circuitry.

Component 350 illustratively receives three control signals, one labeled "R/E" that indicates a reduce or an enlarge operation, a second an even signal to enable transceiver 352, and a third an odd signal to enable transceiver 354. In addition, transceivers 352 and 354 include circuitry that responds to the control signals, but this circuitry is merely illustrative and could be implemented in many other ways, including logic connected to the lines leading into and out of transceivers 352 and 354. Similarly, a different combination of control signals could be used to control other implementations of component 350.

If a reduce signal and an even signal are received at the same time, driver 360 and other drivers in transceiver 352 provide signals from the lines numbered 0, . . . M, . . . , through 2M-2 from buses 320 and 322 to the lines numbered 0 through M-1 of common bus 156, so that a 2:1 reduction operation is performed to obtain a data item like data item 46 in FIG. 2B. Similarly, if a reduce signal and an odd signal are received at the same time, driver 370 and other drivers in transceiver 354 provide signals from the lines numbered 1, . . . M-1, . . . , through 2M-1 from buses 320 and 322 to the lines numbered 0 through M-1 of common bus 156, so that a 2:1 reduction operation is performed to obtain a data item like data item 48 in FIG. 2B.

If an enlarge signal and an even signal are received at the same time, driver 362 and other drivers in transceiver 352 provide signals from the lines numbered 0 through M-1 of common bus 156 to the even numbered lines 0, . . . M, . . . , through 2M-2 of buses 320 and 322. If an odd signal is also received at the same time, driver 372 and other drivers in transceiver 354 provide signals from the lines numbered 0 through M-1 of common bus 156 to the odd numbered lines 1, . . . M-1, . . . , through 2M-1 of buses 320 and 322, so that a 1:2 enlargement as illustrated in FIG. 2D is performed.

To provide a 1:2 enlargement operation like that shown in FIG. 2C, various other circuitry could be used instead of or in addition to the circuitry shown in FIG. 9. For example, a buffer could be connected in parallel with transceiver 352 to receive a constant value, ON or OFF, at each of its inputs and to provide the constant value to even numbered lines or odd numbered lines of buses 320 and 322 during enlargement. Or the buffer could be replaced by cheaper but slower circuitry to provide constant values through resisters connected to voltage levels representing ON or OFF.

Component 400 in FIG. 10 is similar to component 350 in FIG. 9, but is generalized to allow a number of K-bit pixels in each M-bit word. In performing a 2:1 reduction operation, either transceiver 402 provides the even numbered pixels from buses 320 and 322 to common bus 156 or transceiver 404 provides the odd numbered pixels from buses 320 and 322 to common bus 156. In performing a 1:2 enlargement operation, transceiver 402 provides each pixel from common bus 156 as an even numbered pixel to even bus 320 and odd bus 322, while transceiver 404 provides each pixel as an odd numbered pixel.

Some of the input and output lines of transceivers 402 and 404 are shown, to illustrate several operations.

During an even reduce operation, transceiver 402 provides the first pixel $P_0$ from even bus 320, received on lines 0 through K-1, as the first pixel $P_0$ to common bus 156, on lines 0 through K-1. During an odd reduce operation, transceiver 404 provides the second pixel $P_1$ from even bus 320, received on lines K through 2K-1, as the first pixel $P_0$ to common bus 156 on the same lines. The same pattern is applied for each pair of pixels from even bus 320 and odd bus 322—transceiver 402 provides the even pixel to common bus 156 during an even reduce operation but transceiver 404 provides the odd pixel to common bus 156 on the same lines during an odd reduce operation.

During an enlarge operation during which both even and odd signals are provided, transceiver 402 provides the first pixel P₀ from common bus 156, on lines 0 through K-1, as the first pixel P₀ to even bus 320, on lines 0 through K-1. Similarly, transceiver 404 provides the first pixel P₀ from common bus 156 as the second pixel P₁ to even bus 320, on lines K through 2K-1. The same pattern is applied for each pixel from common bus 156—transceiver 402 provides the pixel as an even numbered pixel to even bus 320 or odd bus 322 and transceiver 404 provides the same pixel as an odd numbered pixel to even bus 320 or odd bus 322.

To provide a 1:2 enlargement operation like that shown in FIG. 2C, various other circuitry could be used instead of the circuitry shown in FIG. 10. For example, a buffer could be connected in parallel with transceiver 402 to receive a constant value, ON or OFF, at each of its inputs and to provide the constant value to even numbered lines or odd numbered lines of buses 320 and 322 during enlargement. Or the buffer could be replaced by cheaper but slower circuitry to provide constant values through resisters connected to voltage levels representing ON or OFF.

Component 350 in FIG. 9 and a number of instances of component 400 in FIG. 10, each for a respective pixel size, could be combined to provide reduction/enlargement circuitry 332 in FIG. 8. Separate control signals could be provided to each component, or a multiplexer could be used to determine which component provided its outputs to common bus 156 or to even bus 320 and odd bus 322.

2. N Buses

FIG. 11 shows an implementation of interconnecting circuitry 128 in FIG. 3 in which N buses transfer data between the processing units and reduction/enlargement circuitry. FIG. 12 shows a component that can be used to operate on K-bit pixels in the reduction/enlargement circuitry of FIG. 11.

FIG. 11 shows a generalization of the circuitry in FIG. 8, with N buses 410 through 412, bus 410 being numbered zero and bus 412 being numbered (N-1). Processing units 420, 422, 424, and 426 are four of an array of P processing units that are grouped into P/N groups, with N processing units in each group and with one processing unit in each group connected to each of buses 410 through 412. As a result, processing units 420 through 424, numbered with every Nth number from zero through (P-N), are connected to bus 410 while processing units 422 through 426, numbered with every Nth number from (N-1) through (P-1), are connected to bus 412.

As in FIG. 8, interconnecting circuitry 128 includes a registered transceiver for each processing unit (not shown). The processing units and the respective registered transceivers can be implemented as described above in relation to FIG. 5.

Each of the buses is also connected to common bus 156 through a respective transceiver, with bus 410 connected through transceiver 430 and bus 412 connected through transceiver 432. Buses 156, 320, and 322 can be implemented with conventional 32 bit bus circuitry, and register and decode 154 can provide signals to control data transfer on the buses as described below. Transceivers 430 through 432 can be implemented with conventional 74FCT245 integrated circuits from Integrated Device Technology, Inc., or any equivalent circuitry.

Register and decode 154 can select any of several sources for each of the buses.

The sources for common bus 156 include any of transceivers 430 through 432 and holding register 330. In addition, common bus 156 can receive from components in reduction/enlargement circuitry 434.

The sources for bus 410 include the registered transceivers of processing units 420 through 424 and reduction/enlargement circuitry 434 and transceiver 430. Similarly, the sources for bus 412 include the registered transceivers of processing units 422 through 426 and reduction/enlargement circuitry 434 and transceiver 432.

Holding register 330 can be implemented and operated as described above in relation to FIG. 8.

In addition to the signals described above in relation to FIGS. 4 and 5, register and decode 154 provides control signals to each of transceivers 430 through 432 and to reduction/enlargement circuitry 434. The control signals to each transceiver can indicate when each transceiver should drive the respective bus from common bus 156 or vice versa. The control signals to holding register 330 can indicate when it should store data from common bus 156 and when it should drive common bus 156 with previously stored data. Control signals for reduction/enlargement circuitry 434 and operations performed in response to such control signals are described in greater detail below.

Reduction/enlargement circuitry 434 can include various kinds of circuitry. For example, it can include circuitry for performing N:1 reduction on a data item obtained from buses 410 through 412. It can also include circuitry for performing 1:N enlargement on a data item obtained from common bus 156. And reduction/enlargement circuitry 434 can include plural components connected in parallel, such as components appropriate for different pixel lengths.

FIG. 12 shows a generalized component 450 for performing N:1 reduction and 1:N enlargement on K-bit pixels. As set forth above in relation to FIG. 2F, each M-bit word includes Q K-bit pixels, so that the combined width of buses 410 through 412 is N*Q pixels, or N*M bits. Component 450 includes N bidirectional transceivers 452, 454, through 456, each connected between common bus 156 on one side and buses 410 through 412 on the other side. Transceivers 452, 454, through 456 could be implemented as described above in relation to FIG. 9.

Component 450 receives a signal labeled "R/E" indicating a reduce operation or an enlarge operation, and N enable signals, one for each of transceivers 452,454, through 456. Circuitry similar to that described in relation to FIG. 9 can be provided to respond appropriately to each control signal, with the results shown in FIG. 12.

In response to a reduce signal and the zeroth enable signal, transceiver 452 performs an N:1 reduction by providing to common bus 156 pixels $P_0$, $P_N$, and every Nth pixel from buses 410 through 412 up to pixel $P_{N(Q-1)}$. In response to a reduce signal and the first enable signal, transceiver 454 similarly provides every Nth pixel starting with pixel $P_1$, and so forth. Each N:1 reduction thus provides an M-bit word that includes Q pixels, $P_0$ through $P_{Q-1}$.

In response to an enlarge signal and the zeroth enable signal, transceiver 452 provides the pixels it receives from common bus 156 as every Nth pixel on buses 410 through 412, starting with the first pixel $P_0$ and continuing to pixel $P_N$ and ending with pixel $P_{N(Q-1)}$. Similarly, transceivers 454 through 456 each respond to the enlarge signal and the respective enable signal by providing the pixels from common bus 156 as every Nth pixel on buses 410 through 412, each starting with a respective different pixel, so that the result is a 1:N enlargement operation providing a data item that includes N*M bits and N*Q pixels. For example, transceiver 454 starts with pixel $P_1$ and provides every Nth pixel up to pixel $P_{N(Q-1)+1}$. Similarly, transceiver 456 starts with pixel $P_{N-1}$ and provides every Nth pixel up to pixel $P_{NQ-1}$. Various alternatives to transceivers 454 through 456 are discussed above in relation to FIG. 9.

3. Microinstruction Sequences

FIG. 13 shows acts in executing a sequence of microinstructions that perform a subsampling operation. FIG. 14 shows acts in executing a sequence of microinstructions that perform a spreading operation. Both sequences include steps similar to steps described in relation to FIGS. 9–13 of the Common Bus application. As in the Common Bus application, each box in FIGS. 13 and 14 represents acts performed during a single clock cycle, and acts in addition to those shown in FIGS. 13 and 14 could be performed during the same clock cycles in response to appropriate microinstructions.

In addition to the microinstruction fields mentioned above in relation to FIG. 5, each microinstruction could include a four or more bit field indicating sources to drive even bus 320 and odd bus 322 in FIG. 8 or buses 410 through 412 in FIG. 11, such as common bus 156 through even transceiver 324 and odd transceiver 326 in FIG. 8; common bus 156 through transceivers 430 through 432 in FIG. 11; and reduction/enlargement circuitry 332 in FIG. 8 or reduction/enlargement circuitry 434 in FIG. 11. Also, the three bit field indicating a source to drive common bus 156 could, when appropriate, indicate that common bus 156 is driven from even transceiver 324 or odd transceiver 326 in FIG. 8; from one of transceivers 430 through 432 in FIG. 11; or from reduction/enlargement circuitry 332 in FIG. 8 or reduction/enlargement circuitry 434 in FIG. 11. If a microinstruction field indicates reduction/enlargement circuitry is a source and the reduction/enlargement circuitry can handle more than one pixel size, the microinstruction field can indicate the pixel size at which an operation should be performed. If a microinstruction field indicates reduction/enlargement circuitry is a source and the reduction/enlargement circuitry can perform a reduction operation that produces an even or odd data item as in FIGS. 9 and 10 or one of N possible data items as in FIG. 12, the microinstruction field can indicate even or odd or one of the N possible data items.

In FIG. 13, clock cycle 480 includes an act that begins a subsampling operation by fetching a first microinstruction (μInst1). μInst1 can include information specifying how to obtain data, as in clock cycle 350 in FIG. 9 or clock cycle 370 of FIG. 10 of the Common Bus application. μInst1 may be at the end of a sequence of microinstructions that performed operations obtaining the data. These operations could include read operations to obtain data defining an image from a host processor as described in the Bus Master application.

Copending coassigned U.S. Patent Application No. 07/449,627, now continued as U.S. patent application Ser. No. 08/010,825, entitled "Image Reduction/Enlargement Technique", incorporated herein by reference, describes sequences of shifts and logical operations that could then be used, for example, to produce one reduced binary pixel for every 2×2 square of binary pixels in a pair of lines on which a 2:1 reduction is being performed. Similar techniques could be used to operate on a pair of lines of multi-bit pixels to obtain one multi-bit pixel for each 2×2 square, such as by arbitrarily selecting one pixel value from the square or by determining the minimum or maximum pixel value in the square. In any case, the resulting pixels can all be positioned in even or odd pixel positions in one of the lines.

If an N:1 reduction is being performed, similar techniques can be used to operate on a sequence of N lines to obtain one pixel for each N×N square. The resulting pixels can all be positioned in one of each N lines in preparation for reduction.

Clock cycle 482 includes an act that executes μInst1, obtaining data as described above. The complete act of obtaining data being subsampled may require execution of a sequence of microinstructions, with μInst1 being the last in the sequence. Clock cycle 482 also includes an act that fetches a second microinstruction (μInst2) whose address was loaded into MAR 152 during clock cycle 480. μInst2 specifies operations that load the data obtained in each processing unit in clock cycle 482 into its register 212, as in clock cycle 352 in FIG. 9 or clock cycle 372 in FIG. 10 in the Common Bus application.

Clock cycle 484 includes an act that executes μInst2, providing signals that load data into each processing unit's register 212, as in clock cycle 354 in FIG. 9 or clock cycle 374 in FIG. 10 in the Common Bus application. Clock cycle 484 also includes an act that fetches a third microinstruction (μInst3) whose address was loaded into MAR 152 during clock cycle 482. μInst3 specifies operations that transfer data from the registers of a group of processing units through subsampling circuitry into holding register 330. In the implementation of FIG. 8, for example, μInst3 can specify the register of one of processing units 302 through 306 as a source for data on even bus 320 and the register of one of processing units 304 through 308 as a source for data on odd bus 322; μInst3 can further specify reduction/enlargement circuitry 332 as a source for data on common bus 156, that a binary reduction should be performed to obtain even numbered pixels or odd numbered pixels, and that holding register 330 should perform a load operation. In the implementation of FIG. 11, μInst3 can specify the register of one of the processing units on each of buses 410 through 412 as a source; μInst3 can further specify reduction/enlargement circuitry 434 as a source for data on common bus 156, which one of each N pixels should be preserved by a reduction operation, and that holding register 330 should perform a load operation.

Clock cycle 486 includes an act that executes μInst3, providing signals that select registers as sources on the buses; signals that select the reduction/enlargement circuitry as a source for common bus 156; control signals to the reduction/enlargement circuitry to perform the requested operation; and signals to holding register 330 to load the resulting item of data from common bus 156. Clock cycle 486 also includes an act that fetches a fourth microinstruction (μInst4) whose address was loaded into MAR 152 during clock cycle 484. μInst4 specifies operations that transfer an item of data from holding register 330 through a transceiver to one of the buses and then to the registers of processing units on the bus.

In the implementation of FIG. 8, for example, μInst4 could specify that holding register 330 is a source for common bus 156 and that one of even transceiver 324 and odd transceiver 326 is a source for the respective one of even bus 320 and odd bus 322. If the acts in boxes 484, 486, 488, and 490 are repeatedly iterated in the implementation of FIG. 8, the result from alternate iterations would be provided to even transceiver 324 and odd transceiver 326.

In the implementation of FIG. 11, $\mu$Inst4 could specify that holding register 330 is a source for common bus 156 and that one of transceivers 430 through 432 is a source for the respective one of buses 410 through 412. If the acts in boxes 484, 486, 488, and 490 are repeatedly iterated in the implementation of FIG. 11, the results would be rotated among transceivers 430 through 432 so that each transceiver receives a result of one of every N iterations.

Clock cycle 488 includes an act that executes $\mu$Inst4, providing signals to holding register 330 and to the transceivers so that an item of data is transferred to the registers of the processing units connected to one of the buses. Clock cycle 488 also includes an act that fetches a fifth microinstruction ($\mu$Inst5) whose address was loaded into MAR 152 during clock cycle 486. $\mu$Inst5 specifies operations that transfer data from the register of one of the processing units into the processing unit, which can be done as described in relation to clock cycle 392 in FIG. 11 and clock cycle 412 in FIG. 12 of the Common Bus application.

Clock cycle 490 includes an act that executes $\mu$Inst5, providing signals to transfer data into one of the processing units, which can be done as described in relation to clock cycle 394 in FIG. 11 and clock cycle 414 in FIG. 12 of the Common Bus application. If the items of data transferred in clock cycle 484 came from a group of processing units, clock cycle 490 can transfer the resulting item of data back to one of the group, so as to keep the image compact after subsampling.

Clock cycle 490 also includes an act that fetches a next microinstruction. As suggested by the dashed lines in FIG. 13, the next microinstruction could be similar to $\mu$Inst1 or $\mu$Inst2, for example. If the operation in clock cycle 482 obtained data in all of the processing units, acts as in clock cycles 484, 486, 488, and 490 could be repeated as many times as necessary to perform subsampling on all the data obtained. Then, acts as in clock cycle 482 could again be performed for another segment of an image such as an adjacent tile, with edge crossing operations if necessary as described in copending coassigned U.S. patent application 07/993,286, entitled "Edge Crossing Circuitry for SIMD Architecture", incorporated herein by reference. The results from the different tiles should be returned to the processing units in a way that keeps the image compact after subsampling, which can be accomplished by alternating or rotating the results among the buses as discussed above.

In FIG. 14, clock cycle 500 includes an act that begins a spreading operation by fetching a first microinstruction ($\mu$Inst1). $\mu$Inst1 can include information specifying how to obtain data, as in box 350 in FIG. 9 or box 370 of FIG. 10 of the Common Bus application. $\mu$Inst1 may be at the end of a sequence of microinstructions that performed operations obtaining the data. These operations could include read operations to obtain data defining an image from a host processor as described in the Bus Master application.

Clock cycle 502 includes an act that executes $\mu$Inst1, obtaining data as described above. Clock cycle 502 also includes an act that fetches a second microinstruction ($\mu$Inst2) whose address was loaded into MAR 152 during clock cycle 500. $\mu$Inst2 specifies operations that load the data obtained in each processing unit in clock cycle 502 into its register 212, as in clock cycle 352 in FIG. 9 or clock cycle 372 in FIG. 10 in the Common Bus application.

Clock cycle 504 includes an act that executes $\mu$Inst2, providing signals that load data into each processing unit's register 212, as in clock cycle 354 in FIG. 9 or clock cycle 374 in FIG. 10 in the Common Bus application. Clock cycle 504 also includes an act that fetches a third microinstruction ($\mu$Inst3) whose address was loaded into MAR 152 during clock cycle 502. $\mu$Inst3 specifies operations that transfer data from the register of one of the processing units through the respective transceiver into holding register 330.

In the implementation of FIG. 8, for example, $\mu$Inst3 can specify the register of one of processing units 302 through 306 as a source for data on even bus 320 or the register of one of processing units 304 through 308 as a source for data on odd bus 322; $\mu$Inst3 can further specify that one of even transceiver 324 or odd transceiver 326 is a source for data on common bus 156 and that holding register 330 should perform a load operation. If the acts in boxes 504, 506, 508, and 510 are repeatedly iterated in the implementation of FIG. 8, the source for data for alternate iterations would be provided by even transceiver 324 and odd transceiver 326.

In the implementation of FIG. 11, $\mu$Inst3 can specify the register of one of the processing units on one of buses 410 through 412 as a source; $\mu$Inst3 can further specify that the respective one of transceivers 430 through 432 is a source for data on common bus 156 and that holding register 330 should perform a load operation. If the acts in boxes 504, 506, 508, and 510 are repeatedly iterated in the implementation of FIG. 11, the source for data would be rotated among transceivers 430 through 432 so that each transceiver provides data for one of every N iterations.

Clock cycle 506 includes an act that executes $\mu$Inst3, providing signals that select a register as a source on one of the buses; signals that select the respective transceiver as a source for common bus 156; and signals to holding register 330 to load an item of data from common bus 156. Clock cycle 506 also includes an act that fetches a fourth microinstruction ($\mu$Inst4) whose address was loaded into MAR 152 during clock cycle 504. $\mu$Inst4 specifies operations that transfer an item of data from holding register 330 through spreading circuitry to the buses and then to the registers of processing units on the buses. In the implementation of FIG. 8, for example, $\mu$Inst4 could specify that holding register 330 is a source for common bus 156, that reduction/enlargement circuitry 332 is a source for even bus 320 and odd bus 322, and that an enlarge operation should be performed. In the implementation of FIG. 11, $\mu$Inst4 could specify that holding register 330 is a source for common bus 156, that reduction/enlargement circuitry 434 is a source for buses 410 through 412, and that an enlarge operation should be performed.

Clock cycle 508 includes an act that executes $\mu$Inst4, providing signals to holding register 330 and to the reduction/enlargement circuitry so that an item of data is transferred to the reduction/enlargement circuitry and so that words making up the resulting item of data are distributed to the registers of processing units connected to each of the buses. Clock cycle 508 also includes an act that fetches a fifth microinstruction (μInst5) whose address was loaded into MAR 152 during clock cycle 506. μInst5 specifies operations that transfer data from the registers of the processing units in a group that includes one processing unit connected to each of the buses into the processing unit, which can be done as described in relation to clock cycle 392 in FIG. 11 and clock cycle 412 in FIG. 12 of the Common Bus application, selecting a set of processing units that form the group.

Clock cycle 510 includes an act that executes μInst5, providing signals to transfer data into one of the processing units, which can be done as described in relation to clock cycle 394 in FIG. 11 and clock cycle 414 in FIG. 12 of the Common Bus application. If appropriate, additional acts can be performed in subsequent clock cycles to write an enlarged line of pixels into two lines of memory.

Clock cycle 510 also includes an act that fetches a next microinstruction. As suggested by the dashed lines in FIG. 14, the next microinstruction could be similar to μInst1 or μInst2, for example. If the operation in clock cycle 502 obtained data in all of the processing units, acts as in clock cycles 504, 506, 508, and 510 could be repeated as many times as necessary to perform spreading on all the data obtained. Then, acts as in clock cycle 502 could again be performed for another segment of an image such as another column of the same tile or the first column of an adjacent tile, with edge crossing operations if necessary as described in copending coassigned U.S. patent application Ser. No. 07/993,286, entitled "Edge Crossing Circuitry for SIMD Architecture", incorporated herein by reference.

Also, if the reduction/enlargement circuitry is implemented such that alternate pixels are not replicated during enlargement, additional shift and logical operations may be necessary to expand each pixel into a 2×2 square of pixels. For example, a line of binary pixels could be shifted, ORed with itself, and written into two lines of memory.

The techniques of FIGS. 13 and 14 could be implemented to reduce or enlarge an entire line of an image using pipeline techniques like those described in the Common Bus application. While reduced or enlarged data is being transferred from holding register 330 to registered transceiver 212, data for the next cycle of reduction or enlargement could be transferred to registered transceiver 212 from each processing unit. Similarly, while data from registered transceiver 212 is being provided to a processing unit, data from registered transceiver 212 could be transferred to holding register 330.

F. Specific Applications

The invention could be applied in many ways, including image processing of the type described in U.S. Patent Nos. 5,065,437; 5,048,109; 5,129,014; and 5,131,049. Such image processing techniques use data defining a first image to obtain a second image through operations such as erosion and dilation, operations that are defined in the Serra books cited above. Such operations can, for example, be performed by a series of suboperations each of which shifts an original image to obtain a shifted image and then performs a Boolean operation with values from the original image and the shifted image at each location. Such operations are often interspersed with reduction and enlargement operations, which can be performed in accordance with the invention as described above. It is believed that a processor implemented as described above could cost-effectively produce reduced images at a rate of $4 \times 10^8$ bits per second, roughly 200 times faster than a serial implementation on a SPARCStation 2.

The invention could also be applied to perform various other image processing operations.

In addition to reduction, subsampling circuitry could be used to convert multi-bit pixels such as gray scale or color pixels to pixels with fewer bits such as binary pixels. For example, the more significant bit of each two-bit pixel could be used to obtain a binary pixel by operations similar to those described above in relation to FIGS. 2A and 2B.

Subsampling circuitry can also be used in a technique that reduces the number of bits per pixel by applying a threshold. Each processing unit could subtract a threshold value from each pixel value to obtain a sign flag bit indicating whether the pixel value is as great as the threshold value. Or the subsampling circuitry could simply use the most significant bit of each pixel value as a flag bit, if the threshold is one-half the maximum pixel value. Then, subsampling could be performed repeatedly to obtain just the flag bits in a packed array. For example, to perform $N^M$:1 reduction, N:1 reduction could be performed M times.

For greater generality, the subsampling circuitry could include thresholding circuitry. The thresholding circuitry could include logic for comparing a group of pixels or a multi-bit pixel such as a gray scale pixel or color pixel with a threshold. This logic would permit rapid thresholded subsampling. The logic could also be used, for example, to convert a gray scale or color image with multi-bit pixels to a binary image with one bit pixels.

Where K-bit pixels are handled by 2K-bit microprocessors, such as 8-bit pixels on 16 bit microprocessors, problems can arise with cross-pixel carry effects; for example, if two pixels are packed into each microprocessor, carries or borrows from the lower pixel may affect the upper one, yielding incorrect results. To alleviate this problem, 1:2 spreading circuitry could be used to spread each K-bit pixel to 2K bits, such as by adding a constant value in the upper byte. The 2K-bit pixels would avoid problematic cross-pixel carry effects because the microprocessor would be operating on only one pixel at a time. After performing arithmetic operations, each line could be shifted to position the resulting K-bit pixels in even number byte positions and 2:1 subsampling circuitry could then be used to reduce the image to its original size. This application could be extended to microprocessors with any integer multiple of K-bits, with each pixel being spread to 2K bits, 4K bits, or whatever number of bits is sufficient to avoid problematic carry effects.

Copending coassigned U.S. patent application Ser. No. 07/993,925, entitled "Performing Arithmetic in Parallel on Composite Operands with Packed Multi-bit Components", incorporated herein by reference, describes techniques for performing packed pixel arithmetic that could be used to alleviate cross-pixel carry effects with greater efficiency.

In some situations, subsampling circuitry can be used to rotate blocks of an image in a way that does not require the additional buffers described in copending coassigned U.S. patent application Ser. No. 07/994,490, entitled "One Dimensional SIMD System with Buffers for Performing Orthogonal Rotations", incorporated herein by reference. If the degree of reduction and the pixel size are such that one pixel is chosen from each processing unit, i.e. the number of bits per pixel times the reduction degree equals the processing unit bit width, then subsampling circuitry can be used to rotate a rectangle.

This technique can be implemented by first loading the rows of the rectangle into successive processing units. Then, the subsampling circuitry can use an item of data that includes one word from each of the processing units to obtain an item of data that includes one n-bit pixel from each processing unit in the group. Since the subsampling circuitry takes the same relative pixel from each processing unit, the group of pixels chosen forms a column of pixels in the rectangle. The pixels of this column, placed side by side, form a new row of the rotated rectangle, and the new row can be transferred to a destination processing unit. To obtain all the new rows, data words could be shifted in the processing units in parallel or additional subsampling circuitry could be employed to use other columns to obtain other rows.

G. Miscellaneous

The invention has been described in relation to implementations in which a common bus is connected to subsampling/spreading circuitry and can receive any of a number of data items that could be produced by a subsampling operation. For example, the common bus can receive either the even numbered bits or the odd numbered bits resulting from a 2:1 subsampling operation. The invention might also be implemented with a plurality of buses connected to receive data items produced by subsampling operations.

The invention has been described in relation to implementations with conventional microprocessors, but the invention might also be implemented with reduced instruction set (RISC) chips. Such RISC chips do not conventionally have shift inputs and outputs, so that shared memory might be necessary to perform shifting operations between processing units.

The invention has been described in relation to implementations in which processing units are connected into a one-dimensional array. The invention might also be implemented with a parallel processor in which the processing units are connected into a two- or three-dimensional array or into any other suitable arrangement.

The invention has been described in relation to implementations in which bits remain uninverted while being transferred between components in a parallel processor. The invention might also be implemented with inversions during data transfer to increase performance, such as an inversion when an item of data is loaded into a holding register and another inversion when the item of data is read out of the holding register.

The invention has been described in relation to an implementation that includes a SIMD parallel processor in which coprocessor control circuitry has two control lines to each processing unit, one to select a register as a source of data on a common bus and the other to write enable the processing unit's memory. The invention might be implemented with other types of parallel processors. For example, the invention could be implemented with additional lines to each processing unit, such as separate instruction and address lines so that each processing unit could operate independently of other processing units. In addition, special write enable lines could be provided to write independently in the memories of different processing units or independently in the memory of a specific microprocessor in each processing unit.

The invention has been described in relation to implementations in which control circuitry provides addresses in parallel to processing units. The invention might also be implemented with a parallel processor in which processing units independently obtain addresses, such as from a local address processor or from an address processor that serves a subset of processing units.

The invention has been described in relation to implementations in which processing units include single port memory circuitry. The invention might also be implemented with dual port memory circuitry.

The invention has been described in relation to implementations in which a 32 bit bus interconnects 32 bit registers and in which each processing unit includes two 16 bit microprocessors and a 32 bit SRAM. The invention might also be implemented in numerous other ways with components having different widths. For example, each processing unit might include a 16 bit SRAM for each microprocessor or each processing unit might include a single 32 bit microprocessor. Alternatively, the bus might be a 16 bit or 64 bit bus, and other components could be chosen accordingly. Similarly, the control store, described as implemented with 128 bit microinstructions, might also be implemented with microinstructions of other lengths, such as 64 bit encoded microinstructions. Further the invention might be implemented with a dedicated control store chip.

The invention has been described in relation to implementations that operate on data relating to images, but might also be implemented to operate on data that do not relate to an image.

The invention has been described in relation to implementations that include readily available discrete components. The invention might also be implemented with custom VLSI components, and similarly with custom memory components.

The invention has been described in relation to implementations in which each processing unit includes SRAM, but the invention might also be implemented with other types of memory, such as dynamic RAM, flash RAM, and so forth.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A parallel processor comprising:
   two or more processing units;
   subsampling/spreading circuitry for receiving an item of data defining an image segment and for using the item of data to obtain another item of data that defines the same image segment with a different amount of data;
   data transfer circuitry connecting each of the processing units to the subsampling/spreading circuitry so that the data transfer circuitry can transfer data from any of the processing units to the subsampling/spreading circuitry and so that the data transfer circuitry can transfer data from the subsampling/spreading circuitry to any of the processing units; and
   control circuitry connected for providing control signals to the processing units, the data transfer circuitry, and the subsampling/spreading circuitry; the control signals causing the data transfer circuitry to transfer a first item of data obtained from the processing units to the subsampling/spreading circuitry, causing the subsampling/spreading circuitry to use the first item of data to obtain a second item of data, and causing the data transfer circuitry to transfer the second item of data to the processing units; the first item of data defining a first image segment with a first amount of data, the second item of data defining the first image segment with a second amount of data that is different than the first amount of data.

2. The parallel processor of claim 1 in which the subsampling/spreading circuitry comprises subsampling circuitry; the second amount of data being less than the first amount of data.

3. The parallel processor of claim 2 in which the subsampling circuitry comprises an N:1 subsampling transceiver.

4. The parallel processor of claim 3 in which N=2.

5. The parallel processor of claim 4 in which the first and second items of data each include bit sets, each bit set defining one pixel in the first image segment, the subsampling transceiver uses alternate bit sets from the first item of data to obtain the second item of data.

6. The parallel processor of claim 5 in which each bit set includes one bit.

7. The parallel processor of claim 5 in which each bit set includes a number of bits greater than one.

8. The parallel processor of claim 5 in which the control circuitry further provides control signals to the subsampling transceiver to indicate whether to use even bit sets or odd bit sets from the first item of data to obtain the second item of data.

9. The parallel processor of claim 3 in which the processing units include two or more groups, each group including N processing units; the data transfer circuitry comprising N buses, each connected for providing data to the subsampling transceiver; each group including, for each of the N buses, a respective processing unit connected to the bus such that each processing unit is connected to one of the N buses.

10. The parallel processor of claim 9 in which the first and second items of data each include bit sets, each bit set defining one pixel in the first image segment; the first item of data including a number of bit sets, the number being a multiple of N; the subsampling transceiver using one of N bit sets from the first item of data to obtain the second item of data.

11. The parallel processor of claim 10 in which the first item of data includes two or more sequences of bit sets, each sequence including N bit sets; the control circuitry further providing control signals to the subsampling transceiver to indicate one bit set in each sequence of bit sets to use in obtaining the second item of data.

12. The parallel processor of claim 9 in which the data transfer circuitry further comprises a common bus connected for receiving data from the subsampling transceiver and for providing data to any one of the N buses.

13. The parallel processor of claim 1 in which the subsampling/spreading circuitry comprises spreading circuitry; the second amount of data being greater than the first amount of data.

14. The parallel processor of claim 13 in which the spreading circuitry comprises a 1:N spreading transceiver.

15. The parallel processor of claim 14 in which N=2.

16. The parallel processor of claim 15 in which the first and second items of data each include bit sets, each bit set defining one pixel in the first image segment, the spreading transceiver using each bit set from the first item of data to obtain at least one bit set for the second item of data.

17. The parallel processor of claim 16 in which each bit set includes one bit.

18. The parallel processor of claim 16 in which each bit set includes a number of bits greater than one.

19. The parallel processor of claim 16 in which the spreading transceiver uses each bit set from the first item of data to obtain two bit sets for the second item of data.

20. The parallel processor of claim 16 in which the spreading transceiver uses each bit set from the first item of data to obtain one bit set for the second item of data; alternate bit sets of the second item of data all having equal values.

21. The parallel processor of claim 14 in which the processing units include two or more groups, each group including N processing units; the data transfer circuitry comprising N buses, each connected for receiving data from the spreading transceiver; each group including, for each of the N buses, a respective processing unit connected to the bus such that each processing unit is connected to one of the N buses.

22. The parallel processor of claim 21 in which the data transfer circuitry further comprises a common bus connected for receiving items of data from any one of the N buses and for providing items of data to the spreading transceiver.

23. The parallel processor of claim 1 in which each processing unit comprises processing circuitry for responding to instructions by performing operations on data; the control circuitry further providing a series of items of instruction data to the processing circuitry of each of the processing units; the items of instruction data indicating a sequence of instructions; the control circuitry being connected for providing each item in the series to the processing circuitry of all of the processing units in parallel.

24. A method of operating a parallel processor that includes:

two or more processing units;

subsampling/spreading circuitry for receiving an item of data defining an image segment and for using the item of data to obtain another item of data that defines the same image segment with a different amount of data; and data transfer circuitry connecting each of the processing units to the subsampling/spreading circuitry so that the data transfer circuitry can transfer data from any of the processing units to the subsampling/spreading circuitry and so that the data transfer circuitry can transfer data from the subsampling/spreading circuitry to any of the processing units;

the method comprising acts of:

operating the data transfer circuitry to transfer a first item of data obtained from the processing units to the subsampling/spreading circuitry;

operating the subsampling/spreading circuitry to use the first item of data to obtain a second item of data; and operating the data transfer circuitry to transfer the second item of data to the processing units; the first item of data defining a first image segment with a first amount of data, the second item of data defining the first image segment with a second amount of data that is different than the first amount of data.

25. The method of claim 24 in which the act of operating the subsampling/spreading circuitry obtains the second item of data so that the second amount of data is less than the first amount of data.

26. The method of claim 25 in which the second amount of data is one-half of the first amount of data.

27. The method of claim 26 in which the first and second items of data each include bit sets, each bit set defining one pixel in the first image segment, the act of operating the subsampling/spreading circuitry comprising an act of using alternate bit sets from the first item of data to obtain the second item of data.

28. The method of claim 27 in which the alternate bit sets are even numbered bit sets.

29. The method of claim 27 in which the alternate bit sets are odd numbered bit sets.

30. The method of claim 25 in which the second amount of data is (1/N) of the first amount of data.

31. The method of claim 30 in which the first and second items of data each include bit sets, each bit set defining one pixel in the first image segment; the bit sets of the first item of data including two or more sequences of bit sets, each of the sequences including N bit sets; the act of operating the subsampling/spreading circuitry comprising an act of using one bit set in each sequence of bit sets from the first item of data to obtain the second item of data.

32. The method of claim 24 in which the act of operating the subsampling/spreading circuitry obtains the second item of data so that the second amount of data is greater than the first amount of data.

33. The method of claim 32 in which the second amount of data is twice the first amount of data.

34. The method of claim 32 in which the first and second items of data each include bit sets, each bit set defining one pixel in the first image segment, the act of operating the subsampling/spreading circuitry comprising adding additional bit sets between adjacent bit sets in the first item of data to obtain the second item of data.

35. The method of claim 34 in which the additional bit sets all have a constant value.

36. The method of claim 34 in which each additional bit set has a value that is the same as the value of one of the adjacent bit sets between which the additional bit set is added.

37. The method of claim 32 in which the second amount of data is N times the first amount of data.

38. A parallel processor comprising:

two or more processing units;

subsampling circuitry for receiving an item of data defining an image segment and for using the item of data to obtain another item of data that defines the same image segment with less data;

data transfer circuitry connecting each of the processing units to the subsampling circuitry so that the data transfer circuitry can transfer data from any of the processing units to the subsampling circuitry and so that the data transfer circuitry can transfer data from the subsampling circuitry to any of the processing units; the data transfer circuitry being connected to provide a first number of bits of data from the processing units in parallel to the subsampling circuitry and being connected to provide a second number of bits of data from the subsampling circuitry in parallel to the processing units; the first and second numbers having the ratio M/N, where N is greater than M; and control circuitry connected for providing control signals to the processing units, the data transfer circuitry, and the subsampling circuitry; the control signals causing the data transfer circuitry to transfer a first item of data obtained from the processing units to the subsampling circuitry, causing the subsampling circuitry to use the first item of data to obtain a second item of data, and causing the data transfer circuitry to transfer the second item of data to the processing units; the first item of data defining a first image segment with a first amount of data, the second item of data defining the first image segment with a second amount of data that is different than the first amount of data, the first and second amounts having the ratio M/N.

39. A parallel processor comprising:

two or more processing units;

spreading circuitry for receiving an item of data defining an image segment and for using the item of data to obtain another item of data that defines the same image segment with more data;

data transfer circuitry connecting each of the processing units to the spreading circuitry so that the data transfer circuitry can transfer data from any of the processing units to the spreading circuitry and so that the data transfer circuitry can transfer data from the spreading circuitry to any of the processing units; the data transfer circuitry being connected to provide a first number of bits of data from the processing units in parallel to the spreading circuitry and being connected to provide a second number of bits of data from the spreading circuitry in parallel to the processing units; the first and second numbers having the ratio M/N, where M is greater than N; and control circuitry connected for providing control signals to the processing units, the data transfer circuitry, and the spreading circuitry; the control signals causing the data transfer circuitry to transfer a first item of data obtained from the processing units to the spreading circuitry, causing the spreading circuitry to use the first item of data to obtain a second item of data, and causing the data transfer circuitry to transfer the second item of data to the processing units; the first item of data defining a first image segment with a first amount of data, the second item of data defining the first image segment with a second amount of data that is different than the first amount of data, the first and second amounts having the ratio M/N.

40. The parallel processor of claim 39 in which the second item of data includes additional bits in addition to bits from the first item of data, all of the additional bits having a constant value.

41. The parallel processor of claim 39 in which the second item of data includes N copied bits for each bit in the first item of data, each of the copied bits having a value that is the same as the value of the bit in the first item of data.

42. A parallel processor comprising:

P groups of Q processing units, where P and Q are each greater than one;

subsampling/spreading circuitry for receiving an item of data defining an image segment and for using the item of data to obtain another item of data that defines the same image segment with a different amount of data;

data transfer circuitry connecting each of the processing units to the subsampling circuitry so that the data transfer circuitry can transfer data from any of the processing units to the subsampling/spreading circuitry and so that the data transfer circuitry can transfer data from the subsampling/spreading circuitry to any of the processing units; the data transfer circuitry comprising:

Q buses, each connected for receiving data from and for providing data to the subsampling/spreading circuitry; each of the P groups of Q processing units including, for each of the Q buses, one processing unit connected to the bus such that each processing unit is connected for receiving data from and for providing data to one of the Q buses; and a common bus connected for receiving data from and for providing data to each of the Q buses and also connected for receiving data from and for providing data to the subsampling spreading circuitry; and control circuitry connected for providing subsampling control signals and spreading control signals to the processing units, the data transfer circuitry, and the subsampling/spreading circuitry;

the subsampling control signals causing each of the Q buses to transfer an item of data obtained from one of the processing units to the subsampling/spreading circuitry, causing the subsampling/spreading circuitry to use the items of data from the Q buses to obtain a subsampled item of data, and causing the common bus to transfer the subsampled item of data to one of the Q buses for transfer to one of the processing units;

the spreading control signals causing one of the Q buses to transfer one item of data from one of the processing units to the common bus for transfer to the subsampling/spreading circuitry, causing the subsampling/spreading circuitry to use the one item of data to obtain Q spread items of data, and causing each of the Q buses to transfer one of the Q spread items to one of the processing units.

43. A method of operating a parallel processor that includes:

two or more processing units;

subsampling circuitry for receiving an item of data defining an image segment and for using the item of data to obtain another item of data that defines the same image segment with less data; and data transfer circuitry connecting each of the processing units to the subsampling circuitry so that the data transfer circuitry can transfer data from any of the processing units to the subsampling circuitry and so that the data transfer circuitry can transfer data from the subsampling circuitry to any of the processing units;

the method comprising acts of:

operating the data transfer circuitry to transfer a first item of data obtained from the processing units to the subsampling circuitry; the first item of data defining a first image segment; the first item of data including two or more M-bit pixel values, where M is greater than one;

operating the subsampling circuitry to use the first item of data to obtain a second item of data; the second item of data also defining the first image segment; the second item of data including, for each M-bit pixel value in the first item of data, an N-bit pixel value obtained from the M-bit pixel value, where N is less than M; and operating the data transfer circuitry to transfer the second item of data to the processing units.

44. A method of operating a parallel processor that includes:

two or more processing units;

spreading circuitry for receiving an item of data defining an image segment and for using the item of data to obtain another item of data that defines the same image segment with more data; and data transfer circuitry connecting each of the processing units to the spreading circuitry so that the data transfer circuitry can transfer data from any of the processing units to the spreading circuitry and so that the data transfer circuitry can transfer data from the spreading circuitry to any of the processing units;

the method comprising acts of:

operating the data transfer circuitry to transfer a first item of data obtained from the processing units to the spreading circuitry; the first item of data including first and second pixel values adjacent to each other;

operating the spreading circuitry to use the first item of data to obtain a second item of data; the second item of data including the first and second pixel values and at least one additional bit between the first and second pixel values so that an operation can be performed on the second item of data without cross-pixel effects between the first and second pixel values; and operating the data transfer circuitry to transfer the second item of data to the processing units.

* * * * *